United States Patent
Yanagi et al.

(10) Patent No.: US 7,334,455 B2
(45) Date of Patent: Feb. 26, 2008

(54) LEAK DETECTOR OF LIQUID IN TANK

(75) Inventors: Kiyotaka Yanagi, Ageo (JP); Atsushi Koike, Ageo (JP); Toshimi Nakamura, Ageo (JP); Kiyoshi Yamagishi, Ageo (JP); Hideshi Sekimori, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 104 days.

(21) Appl. No.: 10/577,543

(22) PCT Filed: Aug. 30, 2004

(86) PCT No.: PCT/JP2004/012479

§ 371 (c)(1),
(2), (4) Date: Apr. 28, 2006

(87) PCT Pub. No.: WO2005/043104

PCT Pub. Date: May 12, 2005

(65) Prior Publication Data

US 2007/0157706 A1    Jul. 12, 2007

(30) Foreign Application Priority Data

| Oct. 31, 2003 | (JP) | ............................ | 2003-372766 |
| Oct. 31, 2003 | (JP) | ............................ | 2003-372767 |
| Oct. 31, 2003 | (JP) | ............................ | 2003-372768 |
| Jul. 30, 2004 | (JP) | ............................ | 2004-223687 |

(51) Int. Cl.
*G01M 3/04* (2006.01)

(52) U.S. Cl. ..................................... 73/49.2
(58) Field of Classification Search .............. 73/49.2; 340/605
See application file for complete search history.

(56) References Cited

U.S. PATENT DOCUMENTS 3,331,245 A * 7/1967 Barker ..................... 73/313

(Continued)

FOREIGN PATENT DOCUMENTS

JP    7-35331 A    2/1995

(Continued)

*Primary Examiner*—Hezron Williams
*Assistant Examiner*—John Fitzgerald
(74) *Attorney, Agent, or Firm*—Frommer Lawrence & Haug LLP; Ronald R. Santucci

(57) ABSTRACT

A leak detector comprising a sensor unit including a measuring slim-tube (13b) via the lower end of which a liquid in a tank is led in/out, a measuring tube (17) connected to the upper end thereof and having a sectional area larger than that thereof, and temperature sensors (133, 134) and a heater (135) provided to the slim-tube (13b), and a leak detection control unit (15a) connected to the sensor unit. The leak detection control unit (15a) has a pulse voltage generating circuit for applying a single pulse voltage to the heater (135) and a leak detecting circuit that is connected to the temperature sensors (133, 134) and produces an output equivalent to a temperature difference sensed by these temperature sensors, whereby a value equivalent to a liquid flow rate is calculated by integrating the difference between an output from the leak detecting circuit and its initial value according to a single pulse voltage applied to the heater (135) by the pulse voltage generating circuit, and leakage of liquid from the tank is detected based on this value.

31 Claims, 14 Drawing Sheets

U.S. PATENT DOCUMENTS

| | | | |
|---|---|---|---|
| 3,650,151 A * | 3/1972 | Drexel | 73/861.04 |
| 4,791,814 A * | 12/1988 | Nee | 73/49.2 |
| 4,862,734 A * | 9/1989 | Elderton | 73/49.2 |
| 4,893,498 A * | 1/1990 | Jensen | 73/49.2 |
| 4,964,296 A * | 10/1990 | Jensen | 73/49.2 |
| 4,967,592 A * | 11/1990 | Lagergren et al. | 73/49.2 |
| 5,086,644 A * | 2/1992 | Schendel | 73/49.2 |
| 5,088,317 A * | 2/1992 | Jensen | 73/49.2 |
| 5,131,264 A * | 7/1992 | Jensen | 73/49.2 |
| 5,189,904 A * | 3/1993 | Maresca et al. | 73/40.5 R |
| 5,254,976 A * | 10/1993 | Schueler | 340/605 |
| 5,284,048 A * | 2/1994 | Horner | 73/49.2 |
| 5,375,455 A * | 12/1994 | Maresca et al. | 73/40.5 R |
| 5,445,010 A * | 8/1995 | Peacock | 73/49.2 |
| 5,767,393 A * | 6/1998 | Robertson | 73/49.2 |
| 5,861,547 A * | 1/1999 | Kawai et al. | 73/49.2 |
| 6,920,778 B2 * | 7/2005 | Koike et al. | 73/49.2 |

FOREIGN PATENT DOCUMENTS

| | | |
|---|---|---|
| JP | 2000-74716 A | 3/2000 |
| JP | 2001-296165 A | 10/2001 |
| JP | 2002-310759 A | 10/2002 |
| JP | 2003-185522 A | 7/2003 |
| JP | 2003-214974 A | 7/2003 |
| JP | 2003-222546 A | 8/2003 |
| WO | WO 03/052372 | 6/2003 |
| WO | WO 03/078934 | 9/2003 |

* cited by examiner

LEAK DETECTOR OF LIQUID IN TANK

This application is a 371 of PCT/JP2004/012479 filed on Aug. 30, 2004, published on May 12, 2005 under publication number WO 2005/043104 A1 which claims priority benefits from Japanese Patent Application Number 2003-372766 filed Oct. 31, 2003, Japanese Patent Application Number 2003-372767 filed Oct. 31, 2003, Japanese Patent Application Number 2003-372768 filed Oct. 31, 2003 and Japanese Patent Application Number 2004-223687 filed Jul. 30, 2004.

TECHNICAL FIELD

The present invention relates to a leak detector of liquid in a tank and, more particularly to, a detector of leak of liquid from a tank by converting it into a flow based on the level variation of liquid in a tank.

BACKGROUND ART

Fuel oil or various liquid chemicals are stored in a tank. In recent years, for example, a centralized oiling system for collective housing has been proposed. In this system, kerosene is supplied to the respective homes from a centralized kerosene tank through tubes.

The tank may suffer some cracks due to time degradation. In this case, liquid in the tank leaks from the tank. It is very important to detect such leakage as soon as possible and cope with it adequately for preventing explosion and fire hazard, ambient pollution, or generation of poisonous gas.

As a device for detecting leakage of liquid in a tank in the shortest possible time, JP-A-2003-185522 (Patent Document 1) has proposed a configuration that includes a measuring pipe or measuring tube into which liquid in a tank is introduced and a measuring slim-tube provided below the measuring tube and measures the flow rate of liquid inside the measuring slim-tube using a sensor section additionally provided to the measuring slim-tube to detect a minute variation of the liquid surface in the tank, i.e., a liquid level variation.

In this liquid leakage detection device, an indirectly heated flowmeter is used as a sensor additionally provided to the measuring slim-tube. In this flowmeter, an electric current is applied to a heating element to generate heat, and a part of the heating value is allowed to be absorbed by the liquid. Then, the heat absorption value of the liquid varies in accordance with the liquid flow rate. This characteristic is used to detect influence of the heat absorption based on a variation in an electrical characteristic value such as a resistance value represented by a temperature variation of a temperature-sensitive element.

However, in the indirectly heated flowmeter used in the liquid leakage detection device disclosed in the above Patent Document 1, a variation in an electric circuit output level with respect to a variation in a liquid flow rate becomes small in the region where the flow rate value is as infinitesimal as, e.g., 1 milliliter/h or less, so that an error in the flow rate measurement value tends to increase. Thus, there is a limit to an improvement in leakage detection accuracy.

Assuming that an external power source is used as a power source for current application to a heating element in the above configuration, a power wire needs to be laid from outside to a sensor in the liquid leakage detection device. There is a possibility that an electrical leakage may occur in such a power wire particularly at the lead-in portion to the structural section of the liquid leakage detection device over a long-term use. In the case where a flammable liquid or an electrically conductive liquid is used, a fire or short-circuit associated with the electrical leakage may be caused on the liquid adhered to the structural section of the liquid leakage detection device in some cases.

From the above viewpoint, it is preferable to use a battery installed in the structural section of the liquid leakage detection device as a power source for a heating element of the sensor, particularly in the case where a flammable liquid or an electrically conductive liquid is used. In this case, it is desirable to reduce power consumption of the liquid leakage detection device in order to perform leakage detection without requiring battery replacement as long as possible.

It is also possible to detect leakage of liquid in a tank based on the liquid level variation. The liquid level variation can be measured by using a pressure sensor. Since the pressure sensor detects the liquid level variation by converting a detected liquid pressure to a depth from liquid surface to the pressure sensor, specific gravity of liquid to be measured is involved in the conversion. Therefore, in the case where leakage detection is performed for only liquid to be measured having a constant specific gravity (e.g., water), it is possible to promptly obtain a liquid level value based on an output from the pressure sensor by previously inputting the specific gravity value of the liquid to a conversion program and thereby leakage detection can accurately be performed based on the obtained liquid level value.

However, in the case where the liquid to be measured is a mixed composition containing many organic compounds such as fuel oil (gasoline, naphtha, kerosene, diesel oil, or heavy oil), even if the composition contains the same kind of fuel oil (e.g., kerosene), various kerosenes having different specific gravities (e.g., a specific gravity difference of 0.05) exist in the composition because the compound composition of kerosene differs depending on distillation condition at purification process.

Therefore, when leakage detection is performed for, e.g., kerosene contained in a tank, even if a specific gravity value of standard kerosene is input, as a specific gravity of liquid, to the conversion program from a liquid pressure to liquid level, an error occurs in the conversion when the kerosene actually contained in a tank has a different specific gravity value from the standard kerosene. When the amount of the kerosene in a tank becomes small, the tank is replenished with fresh kerosene. At this time, various types of kerosenes can be added to the tank and, accordingly, the specific gravity value of the kerosene contained in the tank may differ with each replenishment in some cases. Thus, in the case where leakage detection is performed for the mixed composition such as kerosene, liquid level measurement includes the above conversion error, resulting in a reduction of accuracy in leakage detection.

Patent Document 1: JP-A-2003-185522

DISCLOSURE OF INVENTION

Problems to be Solved by the Invention

An object of the present invention is therefore to provide a leak detector capable of detecting leakage without stopping the use of the tank and reducing power consumption.

Another object of the present invention is to provide a leak detector of liquid in a tank capable of detecting a small amount of leakage.

Still another object of the present invention is to provide a leak detector of liquid in a tank capable of detecting leakage of liquid in a tank with high accuracy based on a liquid level variation measured by a pressure sensor.

Means for Solving the Problems

To achieve the above objects, according to the present invention, there is provided a leak detector of liquid in a tank, comprising:

a measuring slim-tube into/from which the liquid in the tank is introduced or discharged through the lower end thereof;

a measuring tube connected to the upper end of the measuring slim-tube and having a sectional area larger than that thereof;

a sensor section additionally provided to the measuring slim-tube and including a first temperature sensor, a heater and a second temperature sensor arranged in this order along the measuring slim-tube, the sensor section measuring the flow rate of the liquid in the measuring slim-tube; and a leak detection control unit connected to the sensor section, wherein the leak detection control unit has a pulse voltage generating circuit for applying a single pulse voltage to the heater and a leak detecting circuit connected to the first and second temperature sensors and generating an output corresponding to a difference between temperatures detected by the first and second temperature sensors, and wherein the leak detection control unit integrates a difference between an output of the leak detecting circuit and its initial value in response to the application of the single pulse voltage to the heater which is performed by the pulse voltage generating circuit to calculate a value equivalent to the flow rate of the liquid to thereby detect leakage of the liquid in the tank based on the calculated value.

In an aspect of the present invention, the single pulse voltage has a pulse width of 2 to 10 seconds, and the value equivalent to the flow rate of the liquid is a value obtained by integrating the output of the leak detecting circuit for 20 to 150 seconds. In an aspect of the present invention, the pulse voltage generating circuit applies the single pulse voltage to the heater at a time interval of 40 seconds to 5 minutes, provided that the time interval is larger than integration time period during which the difference between the output of the leak detecting circuit and its initial value is integrated. In an aspect of the present invention, the leak detection control unit issues a leakage detection signal when the value equivalent to the flow rate of the liquid falls within a predetermined range.

In an aspect of the present invention, a circuit container is attached to the upper portion of the measuring tube, and the leak detection control unit is provided in the circuit container. In an aspect of the present invention, each of the first and second temperature sensors has a first heat transfer member brought into contact with the outer surface of the measuring slim-tube and a temperature sensitive element coupled to the first heat transfer member, and the heater has a second heat transfer member brought into contact with the outer surface of the measuring slim-tube and a heating element coupled to the second heat transfer member.

To achieve the above objects, according to the present invention, there is also provided a leak detector of liquid in a tank, comprising:

a measuring slim-tube into/from which the liquid in the tank is introduced or discharged through the lower end thereof;

a measuring tube connected to the upper end of the measuring slim-tube and having a sectional area larger than that thereof;

a flow rate sensor section additionally provided to the measuring slim-tube and including a first temperature sensor, a heater and a second temperature sensor arranged in this order along the measuring slim-tube, the flow rate sensor section measuring the flow rate of the liquid in the measuring slim-tube;

a pressure sensor for measuring the level of the liquid; and a leak detection control unit connected to the flow rate sensor section and pressure sensor, wherein the leak detection control unit has a voltage generating circuit for applying a voltage to the heater and a leak detecting circuit connected to the first and second temperature sensors and generating an output corresponding to a difference between temperatures detected by the first and second temperature sensors, wherein the leak detection control unit performs a first leakage detection that detects leakage of the liquid in the tank based on the value equivalent to the flow rate of the liquid which is calculated using an output of the leak detecting circuit and a second leakage detection that detects leakage of the liquid in the tank based on the magnitude of a variation rate with respect to time of the level of liquid which is measured by the pressure sensor, and wherein the leak detection control unit outputs a result of the second leakage detection in the case where the magnitude of the liquid level variation rate with respect to time falls within a predetermined range in the second leakage detection, outputs a result of the first leakage detection in the case where the magnitude of the liquid level variation rate with respect to time falls below the lower limit of the predetermined range in the second leakage detection, and stops the output of a leakage detection signal in the case where the magnitude of the liquid level variation rate with respect to time falls above the upper limit of the predetermined range in the second leakage detection.

In an aspect of the present invention, the leak detection control unit stops the first leakage detection for a predetermined time length in the case where the magnitude of the liquid level variation rate with respect to time falls above the upper limit of the predetermined range in the second leakage detection. In an aspect of the present invention, the leak detection control unit stops operations of the voltage generating circuit and leak detecting circuit for the predetermined time length in the case where the magnitude of the liquid level variation rate with respect to time falls above the upper limit of the predetermined range in the second leakage detection.

In an aspect of the present invention, the voltage generating circuit is a pulse voltage generating circuit that applies a single pulse voltage to the heater, and the leak detection control unit integrates a difference between an output of the leak detecting circuit and its initial value in response to the application of the single pulse voltage to the heater which is performed by the pulse voltage generating circuit to calculate the value equivalent to the flow rate of the liquid to thereby detect leakage of the liquid in the tank based on the calculated value. In an aspect of the present invention, the single pulse voltage has a pulse width of 2 to 10 seconds, and the value equivalent to the flow rate of the liquid is a value obtained by integrating the output of the leak detecting circuit for 20 to 150 seconds. In an aspect of the present invention, the pulse voltage generating circuit applies the single pulse voltage to the heater at a time interval of 40 seconds to 5 minutes, provided that the time interval is larger than integration time period during which the difference between the output of the leak detecting circuit and its initial value is integrated.

In an aspect of the present invention, the voltage generating circuit is a constant voltage generating circuit that applies a constant voltage to the heater.

In an aspect of the present invention, the leak detection control unit calculates the liquid level variation rate with respect to time at a time interval of 2 to 10 seconds.

In an aspect of the present invention, a circuit container is attached to the upper portion of the measuring tube, and the leak detection control unit is provided in the circuit container. In an aspect of the present invention, the pressure sensor is disposed near the lower end of the measuring slim-tube. In an aspect of the present invention, each of the first and second temperature sensors has a first heat transfer member brought into contact with the outer surface of the measuring slim-tube and a temperature sensitive element coupled to the first heat transfer member, and the heater has a second heat transfer member brought into contact with the outer surface of the measuring slim-tube and a heating element coupled to the second heat transfer member.

To achieve the above objects, according to the present invention, there is also provided a leak detector of liquid in a tank, comprising:

a measuring slim-tube into/from which the liquid in the tank is introduced or discharged through the lower end thereof;

a measuring tube connected to the upper end of the measuring slim-tube and having a sectional area larger than that thereof;

a flow rate sensor section additionally provided to the measuring slim-tube and including a first temperature sensor, a heater and a second temperature sensor arranged in this order along the measuring slim-tube, the flow rate sensor section measuring the flow rate of the liquid in the measuring slim-tube;

a pressure sensor for measuring the level of the liquid; and a leak detection control unit connected to the flow rate sensor section and pressure sensor, wherein the leak detection control unit has a voltage generating circuit for applying a voltage to the heater, a leak detecting circuit connected to the first and second temperature sensors and generating an output corresponding to a difference between temperatures detected by the first and second temperature sensors, and an on-off valve provided in the upper portion of the measuring tube, and wherein the leak detection control unit detects the specific gravity of the liquid in the tank based on a value equivalent to the flow rate of the liquid which is calculated by using the output of the leak detecting circuit in a state where the on-off valve is closed, measures the level of the liquid by means of the pressure sensor by using the value of the specific gravity detected in the above to thereby perform a leakage detection of the liquid in the tank based on the magnitude of a variation rate of the level of the liquid with respect to time.

In an aspect of the present invention, the leak detection control unit detects the specific gravity of the liquid a plurality of times to thereby obtain a plurality of specific gravity values, and measures the level of the liquid by using an average value of the plurality of specific gravity values as the value of the specific gravity. In an aspect of the present invention, the leak detection control unit uses the obtained value of the specific gravity to measure the level of the liquid only when the value of the specific gravity falls within a certain range defined for liquid of a predetermined kind and performs error processing when the obtained value of the specific gravity falls outside the certain range.

In an aspect of the present invention, the leak detector further comprises a third temperature sensor for measuring the temperature of the liquid, wherein the leak detection control unit is connected to the third temperature sensor, and wherein the leak detection control unit uses a calibration curve of specific gravity at reference temperature to obtain a specific gravity value when detecting the specific gravity, converts the specific gravity value into the value of the specific gravity at an the temperature of the liquid which is measured by the third temperature sensor, and uses the obtained value of the specific gravity to measure the level of the liquid.

In an aspect of the present invention, the leak detection control unit further performs minute leakage detection that detects leakage of the liquid in the tank based on the value equivalent to the flow rate of the liquid which is calculated using the output of the leak detecting circuit in a state where the on-off valve is opened, and wherein the leak detection control unit outputs a result of the leakage detection in the case where the magnitude of the liquid level variation rate with respect to time falls within a predetermined range in the leakage detection, outputs a result of the minute leakage detection in the case where the magnitude of the liquid level variation rate with respect to time falls below the lower limit of the predetermined range in the leakage detection, and stops the output of a leakage detection signal in the case where the magnitude of the liquid level variation rate with respect to time falls above the upper limit of the predetermined range in the leakage detection.

In an aspect of the present invention, the leak detection control unit stops the minute leakage detection for a predetermined time length in the case where the magnitude of the liquid level variation rate with respect to time falls above the upper limit of the predetermined range in the leakage detection. In an aspect of the present invention, the leak detection control unit stops operations of the voltage generating circuit and leak detecting circuit for the predetermined time length in the case where the magnitude of the liquid level variation rate with respect to time falls above the upper limit of the predetermined range in the leakage detection.

In an aspect of the present invention, the voltage generating circuit is a pulse voltage generating circuit that applies a single pulse voltage to the heater, and the leak detection control unit integrates a difference between an output of the leak detecting circuit and its initial value in response to the application of the single pulse voltage to the heater which is performed by the pulse voltage generating circuit to calculate the value equivalent to the flow rate of the liquid. In an aspect of the present invention, the single pulse voltage has a pulse width of 2 to 10 seconds, and the value equivalent to the flow rate of the liquid is a value obtained by integrating the output of the leak detecting circuit for 20 to 150 seconds. In an aspect of the present invention, the pulse voltage generating circuit applies the single pulse voltage to the heater at a time interval of 40 seconds to 5 minutes, provided that the time interval is larger than integration time period during which the difference between the output of the leak detecting circuit and its initial value is integrated. In an aspect of the present invention, the leak detection control unit calculates the liquid level variation rate with respect to time at a time interval of 2 to 10 seconds.

In an aspect of the present invention, a circuit container is attached to the upper portion of the measuring tube, and the leak detection control unit is provided in the circuit container. In an aspect of the present invention, the pressure sensor is disposed near the lower end of the measuring slim-tube. In an aspect of the present invention, each of the first and second temperature sensors has a first heat transfer member brought into contact with the outer surface of the measuring slim-tube and a temperature sensitive element coupled to the first heat transfer member, and the heater has a second heat transfer member brought into contact with the outer surface of the measuring slim-tube and a heating element coupled to the second heat transfer member.

Effect of the Invention

In the present invention, the difference between the output of the leak detecting circuit and its initial value is integrated in response to the application of the single pulse voltage to the heater which is performed by the pulse voltage generating circuit to calculate the value equivalent to the flow rate of the liquid in the measuring slim-tube to thereby detect leakage of the liquid in the tank based on the calculated value. With this configuration, it is possible to perform leakage detection over a long period of time without stopping the use of the tank and reduce power consumption. Therefore, it is possible to use a battery installed in the structural section of the leak detector as a power source for the heater as well as to perform leakage detection over a long period of time without requiring battery replacement.

Further, in the present invention, the first leakage detection and the second leakage detection are performed. The first leakage detection uses the first temperature sensor, the heater and the second temperature sensor which are arranged this order along the measuring slim-tube and allows the heater to generate heat to detect leakage of the liquid in the tank based on the value equivalent to the liquid flow rate which is calculated by using the leak detecting circuit output corresponding to the difference between temperatures detected by the first and second temperature sensors. The second leakage detection detects leakage of the liquid in the tank based on the magnitude of the variation rate with respect to time of the liquid level which is measured by the pressure sensor. In the case where the magnitude of the liquid level variation rate with respect to time falls within the predetermined range in the second leakage detection, the result of the second leakage detection is output. In the case where the magnitude of the liquid level variation rate with respect to time falls below the lower limit of the predetermined range in the second leakage detection, the result of the first leakage detection is output. In the case where the magnitude of the liquid level variation rate with respect to time falls above the upper limit of the predetermined range in the second leakage detection, the output of the leakage detection signal is stopped. With the above configuration, it is possible to accurately detect minute leakage, excluding an abrupt liquid level variation occurring when liquid is introduced into the tank from the outside or when liquid is supplied to the outside. Further, it is possible to detect leakage over a necessary and sufficient leakage amount range with higher accuracy.

When the pulse voltage generating circuit is used as the voltage generating circuit, the difference between the output of the leak detecting circuit and its initial value is integrated in response to the application of the single pulse voltage to the heater which is performed by the pulse voltage generating circuit to calculate the value equivalent to the flow rate of the liquid in the measuring slim-tube to thereby detect leakage of the liquid in the tank based on the calculated value. With this configuration, it is possible to perform leakage detection over a long period of time without stopping the use of the tank and reduce power consumption. Therefore, it is possible to use a battery installed in the structural section of the leak detector as a power source for the heater as well as to perform leakage detection over a long period of time without requiring battery replacement.

Further, in the present invention, the first temperature sensor, the heater and the second temperature sensor are arranged in this order along the measuring slim-tube and the heater is allowed to generate heat. The leak detecting circuit generates the output corresponding to the difference between temperatures detected by the first and second temperature sensors. The leak detecting circuit is used to detect the specific gravity of the liquid in the tank based on the value equivalent to the liquid flow rate which is calculated by using the output of the leak detecting circuit in the state where the on-off valve provided in the upper portion of the measuring tube connected to the upper end of the measuring slim-tube and having the sectional area larger than that thereof is closed. The specific gravity value obtained in the above detection is used to measure the liquid level by means of the pressure sensor to thereby detect leakage of the liquid in the tank based on the magnitude of the liquid level variation rate with respect to time. With the above configuration, it is possible to increase accuracy in detecting leakage of the liquid in the tank based on the variation of the liquid level measured by the pressure sensor irrespective of a value of the specific gravity of the liquid in the tank.

Further, in the present invention, the minute leakage detection detects leakage of the liquid in the tank based on the value equivalent to the liquid flow rate which is calculated by using the output of the leak detecting circuit in the state where the on-off valve is opened, and the leakage detection detects leakage of the liquid in the tank based on the magnitude of the variation rate with respect to time of the liquid level which is measured by the pressure sensor. In the case where the magnitude of the liquid level variation rate with respect to time falls within the predetermined range in the leakage detection, the result of the leakage detection is output. In the case where the magnitude of the liquid level variation rate with respect to time falls below the lower limit of the predetermined range in the leakage detection, the result of the minute leakage detection is output. In the case where the magnitude of the liquid level variation rate with respect to time falls above the upper limit of the predetermined range in the leakage detection, the output of the leakage detection signal is stopped. With the above configuration, it is possible to accurately detect minute leakage, excluding an abrupt liquid level variation occurring when liquid is introduced into the tank from the outside or when liquid is supplied to the outside. Further, it is possible to detect leakage over a necessary and sufficient leakage amount range with higher accuracy.

When the pulse voltage generating circuit is used as the voltage generating circuit, the difference between the output of the leak detecting circuit and its initial value is integrated in response to the application of the single pulse voltage to the heater which is performed by the pulse voltage generating circuit to calculate the value equivalent to the flow rate of the liquid in the measuring slim-tube to thereby detect leakage of the liquid in the tank based on the calculated value. With this configuration, it is possible to perform leakage detection over a long period of time without stopping the use of the tank and reduce power consumption. Therefore, it is possible to use a battery installed in the structural section of the leak detector as a power source for the heater as well as to perform leakage detection over a long period of time without requiring battery replacement.

Best Mode for Carrying out the Invention

Embodiment of the present invention will be described below with reference to the accompanying drawings.

Figure 1:
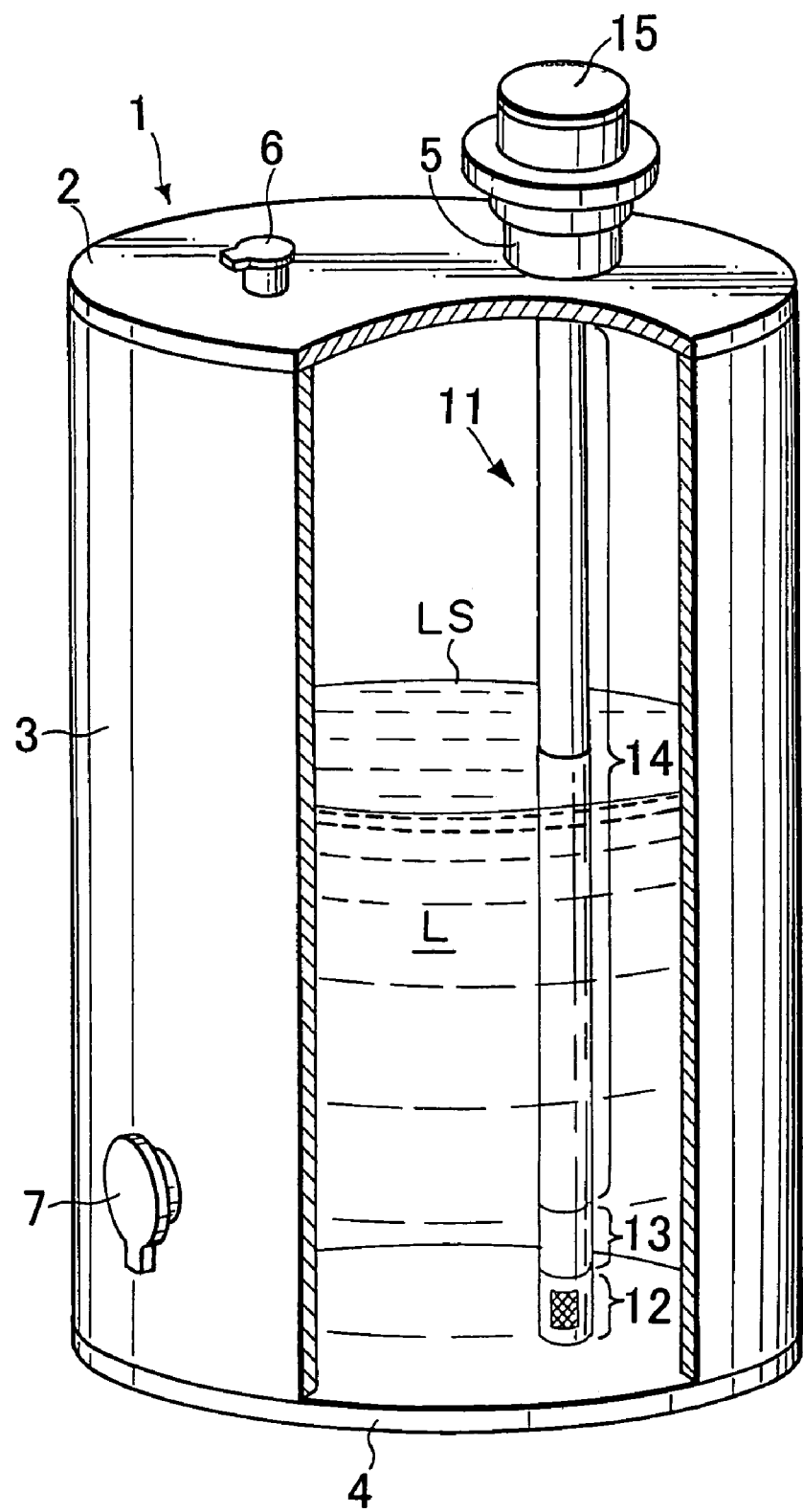
FIG. 1 is a partially broken perspective view for explaining an embodiment of a leak detector of liquid in a tank according to the present invention.
Figure 2:
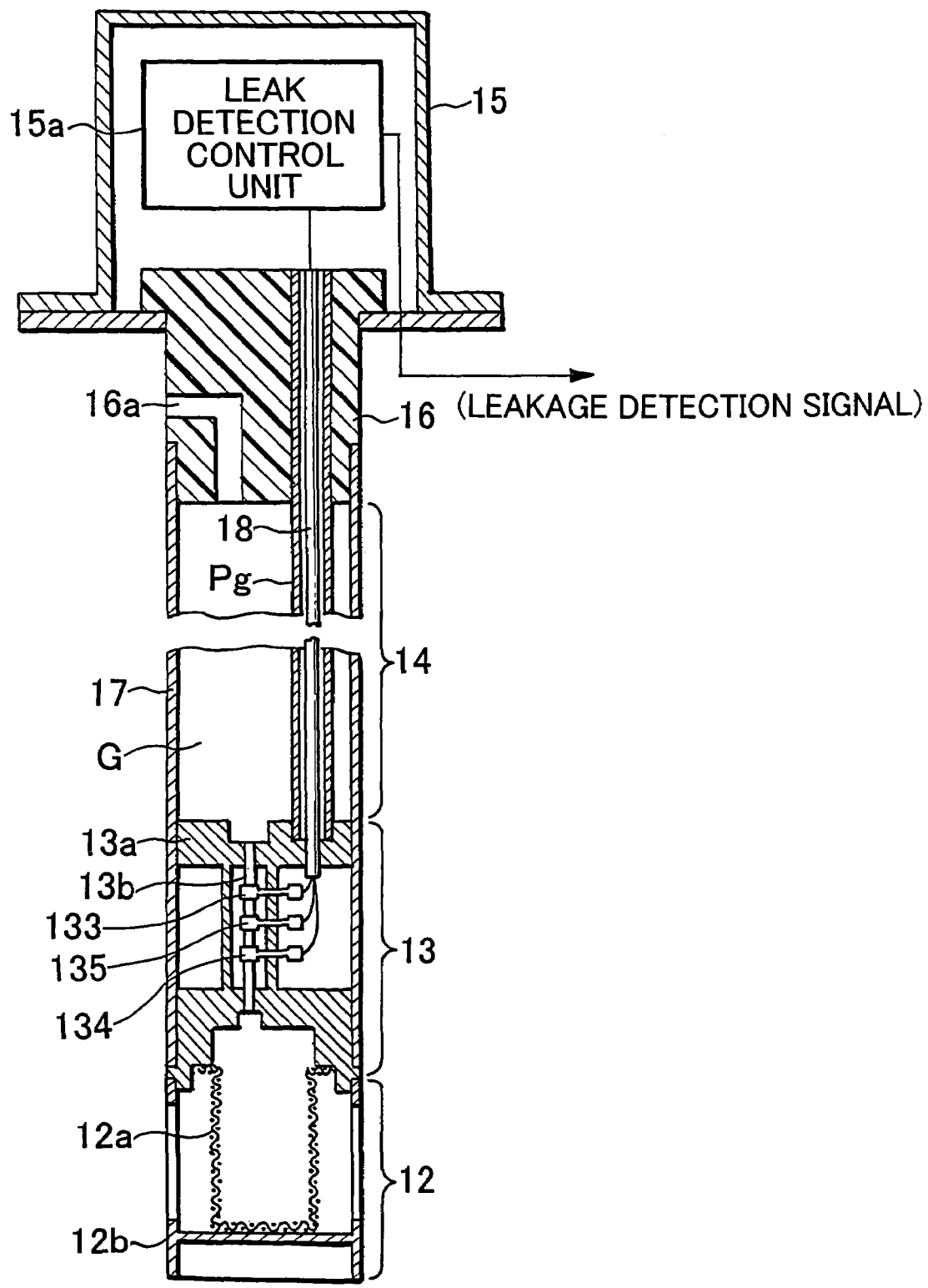
FIG. 2 is a partially omitted cross-sectional view of the leak detector of FIG. 1.

FIG. 1 is a partially broken view for explaining an embodiment of a leak detector of liquid in a tank according to the present invention, and FIG. 2 is a partially omitted cross-sectional view of the leak detector according to the present embodiment.

A tank 1 has a top panel 2 in which a measurement port 5 and a liquid inlet 6 used when liquid is introduced into the tank are formed, a side panel 3 in which a liquid supply port 7 used when liquid in the tank is supplied to the outside is formed, and a bottom panel 4. As shown in FIG. 1, liquid L (flammable liquid of mixed composition containing many organic compounds such as gasoline, diesel oil, kerosene, or the like) is contained in the tank 1. LS denotes a liquid surface.

A portion of a leak detector 11 is inserted into the tank 1 through the measurement port 5 formed in the top panel 2 of the tank 1, and the leak detector 11 is disposed in the vertical direction as a whole. The leak detector 11 includes a liquid inlet/outlet section 12, a flow rate measurement section 13, a liquid pool section 14, a cap 16, and a circuit container 15. The liquid inlet/outlet section 12, flow rate measurement section 13, and liquid pool section 14 are located inside the tank 1. The liquid surface LS is positioned within the height range of the liquid pool section 14. The flow rate measurement section 13 and liquid pool section 14 include a sheath pipe 17 extending over them in the vertical direction.

As shown in FIG. 2, a sensor holder 13a is disposed in the sheath pipe 17 in the flow rate measurement section 13. A measuring slim-tube 13b extending in the vertical direction is fixedly held by the sensor holder 13a. A first temperature sensor 133, a heater 135, and a second temperature sensor 134 are disposed in the measuring slim-tube 13b from above in the order mentioned and attached thereto. The heater 135 is equally spaced apart from the first and second temperature sensors 133 and 134. The outside of the sensor holder 13a is covered with the sheath pipe 17, thereby protecting the first temperature sensor 133, heater 135, and second temperature sensor 134 from being corroded by the liquid L. The measuring slim-tube 13b serves as a liquid passage between the liquid pool section 14 and liquid inlet/outlet section 12. The first temperature sensor 133, heater 135, and second temperature sensor 134 constitute a sensor section for measuring the flow rate of liquid in the measuring slim-tube 13b.

In the liquid inlet/outlet section 12, as shown in FIG. 2, a filter cover 12b fixes a filter 12a to the lower portion of the sensor holder 13a. The filter 12a has a function of filtrating the liquid in the tank so as to introduce it, without foreign substances such as sludge floated or deposited in the liquid in the tank, into the liquid pool section 14 through the measuring slim-tube 13b. An opening is formed in the side wall of the filter cover 12b, and the liquid L in the tank 1 is introduced into the measuring slim-tube 13b through the filter 12a of the liquid inlet/outlet section 12.

The liquid pool section 14 is located above the flow rate measurement section 13 and has a space G surrounded by the sheath pipe 17. Liquid introduced through the measuring slim-tube 13b is pooled in the space G. The cap 16 is fixed to the upper portion of the sheath pipe 17 and has an air path 16a for communicating the space in the liquid pool section 14 with space in the tank 1 outside the detector. The circuit container 15, which is attached to the cap 16, contains a leak detection control unit 15a. A guide pipe Pg extends in the sheath pipe 17 so as to connect the upper portion of the sensor holder 13a and cap 16 and, inside the guide pipe Pg, a wiring 18 extends so as to connect the first temperature sensor 133, heater 135 and second temperature sensor 134 with the leak detection control unit 15a.

The sheath pipe 17 in the liquid pool section 14 serves as a measuring tube of the present invention. The sectional area of the measuring slim-tube 13b is set much smaller (e.g., 1/50 or more, 1/100 or less, or 1/300 or less) than that of the sheath pipe 17 (excluding the sectional area of the guide pipe Pg). This configuration allows liquid flow through the measuring slim-tube 13b to be measurable even in the case of a slight liquid level variation accompanied by a slight liquid leakage.

It is preferable that the sheath pipe 17, sensor holder 13a, filter cover 12b, cap 16, and guide pipe Pg be made of metal having a heat expansion coefficient approximate to that of a material constituting the tank 1 and be made of the same metal as the material of the tank 1, such as casting iron or stainless steel.

Figure 3:
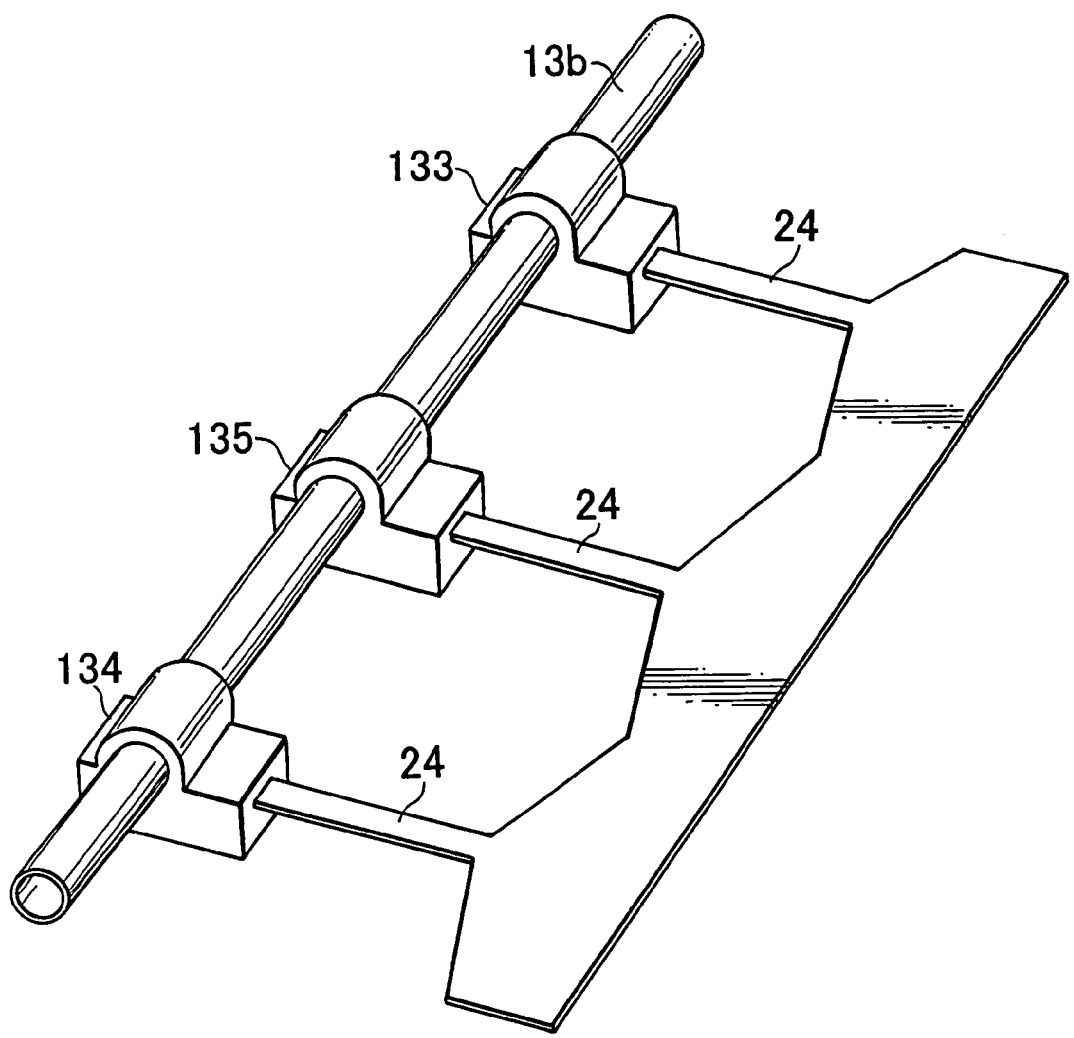
FIG. 3 is an enlarged perspective view showing a part where the first temperature sensor, heater, and second temperature sensor are attached to a measuring slim-tube.
Figure 4:
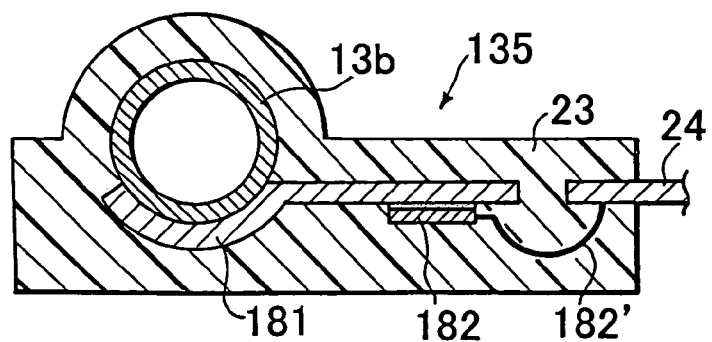
FIG. 4 is a cross-sectional view of FIG. 3.

FIG. 3 is an enlarged perspective view showing a part where the first temperature sensor 133, heater 135, and second temperature sensor 134 are attached to the measuring slim-tube, and FIG. 4 is a cross-sectional view of FIG. 3. The heater 135 has a heat transfer member 181 brought into contact with the outer surface of the measuring slim-tube 13b and a thin-film heating element 182 stacked on the heat transfer member 181 through a dielectric thin-film. The thin-film heating element 182 is formed in a predetermined pattern. A wiring 182' is connected to the electrode of the thin-film heating element 182 for current application to the thin-film heating element 182. The heat transfer member 181 is made of, e.g., metal or alloyed metal having a thickness of about 0.2 mm and width of 2 mm. The wiring 182' is connected to a wiring (not shown) formed on a wiring board 24 such as a flexible wiring board. The latter wiring is connected to the wiring 18 in the guide pipe Pg. The heat transfer member 181, thin-film heating element 182, and wiring 182' are sealed with a plastic sealing member together with a part of the wiring board 24 and a part of the measuring slim-tube 13b. The first and second temperature sensors 133 and 134 have substantially the same configuration as that of the heater 135. Only a different point is that a thin-film temperature-sensitive element is used in place of the thin-film heating element in the first and second temperature sensors 133 and 134.

The leak detector 11 having the configuration described above is attached to the measurement port 5 of the tank 1. Then, the liquid surface LS of the liquid L in the tank is positioned in the height range of the liquid pool section 14, as described above. Accordingly, liquid L in the tank rises through the measuring slim-tube 13b of the flow rate measurement section 13 after being filtrated by the filter 12a of the liquid inlet/outlet section 12, introduced into the space G of the liquid pool section 14, with the result that the surface of the liquid in the liquid pool section 14 reaches the same height as the liquid surface LS of the liquid in the tank outside the leak detector. When the liquid surface LS varies, the surface of the liquid in the liquid pool section 14 correspondingly varies to cause liquid flow in the measuring slim-tube 13b in association with this liquid surface variation, i.e., liquid level variation.

Figure 5:
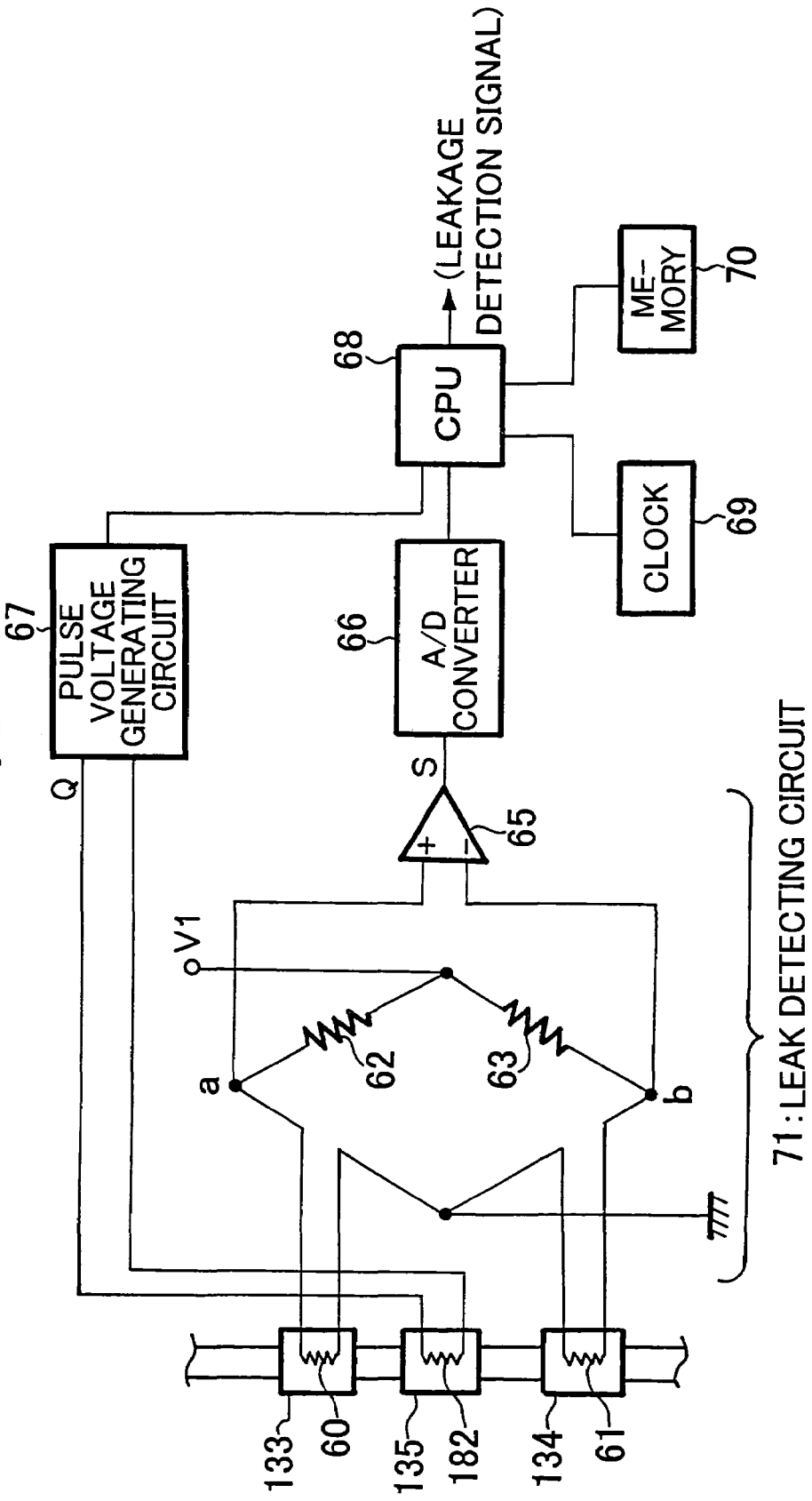
FIG. 5 is a view showing a circuit configuration of a sensor section and leak detection control unit.

FIG. 5 is a view showing a circuit configuration of the sensor section and leak detection control unit. As a power source for the circuits, a not shown battery disposed in the circuit container 15 can be used.

The thin-film heating element 182 of the heater 135 is connected to a pulse voltage generating circuit 67, and a single pulse voltage is timely applied from the pulse voltage generating circuit to the thin-film heating element 182. Thin-film temperature sensitive elements 60 and 61 respectively constituting the first and second temperature sensors 133 and 134 are connected to a leak detecting circuit 71. That is, the thin-film temperature sensitive elements 60 and 61 constitute a bridge circuit together with resistors 62 and 63. A supply voltage V1 is supplied to the bridge circuit, and a voltage output signal corresponding to a potential difference between points a and b can be obtained by a differential amplifier 65. The output of the leak detecting circuit 71, which corresponds to a difference in temperature sensed by the thin-film temperature sensitive elements 60 and 61 of the temperature sensors 133 and 134, is input to a CPU 68 through an A/D converter 66. The pulse voltage generating circuit 67 operates under the control of the CPU 68. A clock 69 and a memory 70 are connected to the CPU.

Leakage detection operation, i.e., operation of the CPU 68 in the present embodiment will be described below.

Figure 6:
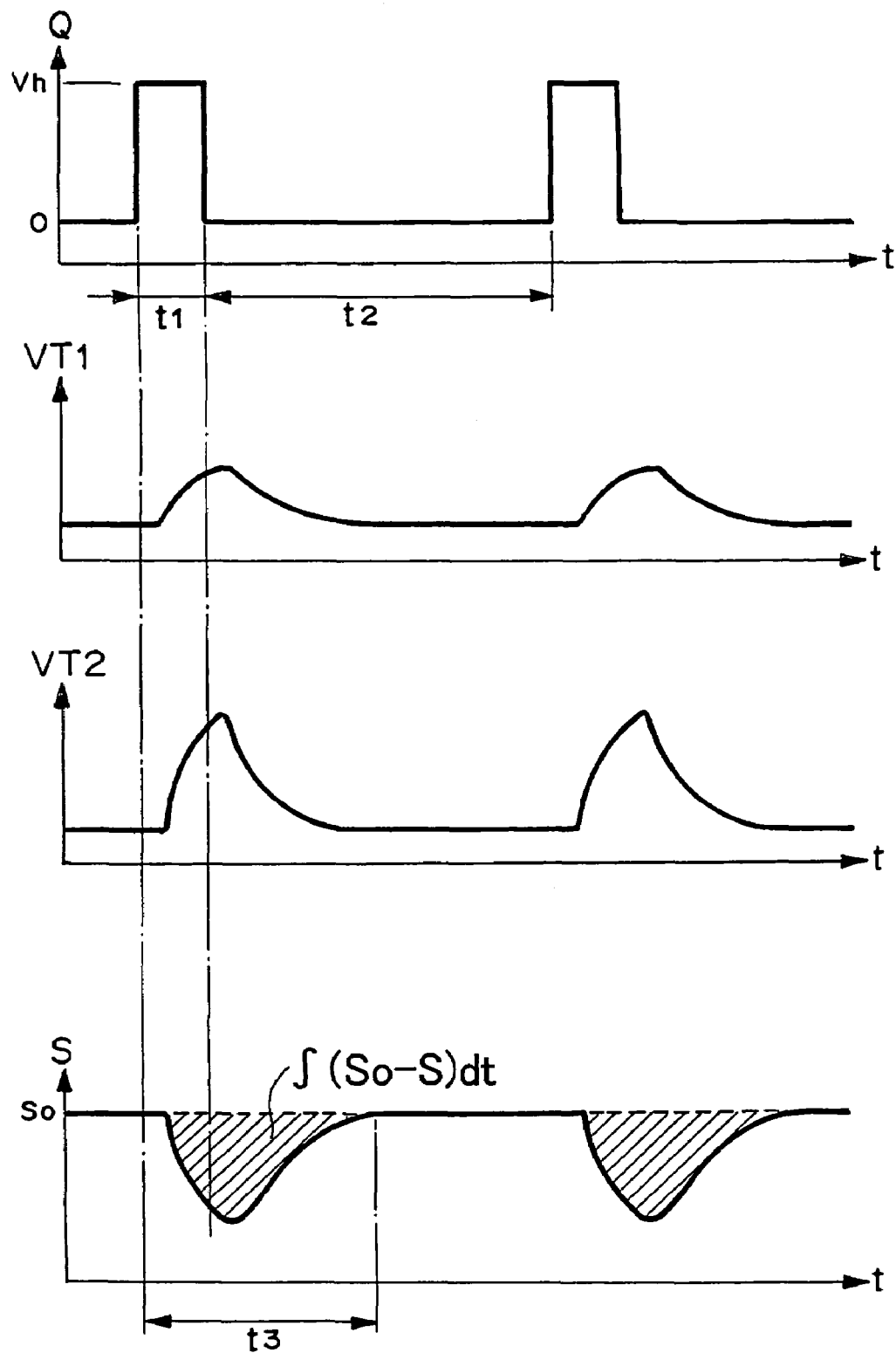
FIG. 6 is a timing chart showing a relationship between a voltage Q to be applied to the thin-film heating element and a voltage output S of a leak detecting circuit.

FIG. 6 is a timing chart showing a relationship between an voltage Q to be applied from the pulse voltage generating circuit 67 to the thin-film heating element 182 and a voltage output S of the leak detecting circuit 71. A single pulse voltage having a time width t1 is applied from the CPU 68 at a predetermined time internal t2 according to the clock 69. In this case, for example, the pulse width t1 corresponds to 2 to 10 seconds, and a pulse height Vh corresponds to 1.5 to 4 V. The above voltage application causes heat in the thin-film heating element 182. The heat then heats the measuring slim-tube 13b and liquid inside the measuring slim-tube 13b and, thereby, is transmitted to the surrounding area. Influence of the heat reaches the thin-film temperature sensitive elements 60 and 61 to thereby vary the temperature of the thin-film temperature sensitive elements. Assuming that the flow rate of liquid in the measuring slim-tube 13b is 0, the temperatures in the two temperature sensitive elements 60 and 61 equally vary, if contribution of natural convection to the heat transfer is ignored. However, in the case where the surface of liquid in the tank is lowered due to, e.g., leakage of liquid in the tank, the liquid is moved downward from the liquid pool section 14 to the measuring slim-tube 13b and is then withdrawn into the tank outside the detector through the liquid inlet/outlet section 12. That is, the liquid in the measuring slim-tube 13b flows downward. It follows that the heat from the thin-film heating element 182 is transferred more to the thin-film temperature sensitive element 61 of the lower side temperature sensor 134 than to the thin-film temperature sensitive element 60 of the upper side temperature sensor 133. As a result, a difference occurs between the temperatures that the two thin film temperature sensitive elements detect, making resistance variation of the thin-film temperature sensitive elements different from each other. FIG. 6 shows a variation in a voltage VT1 to be applied to the thin-film temperature sensitive element 60 of the temperature sensor 133 and a variation in a voltage VT2 to be applied to the thin-film temperature sensitive element 61 of the temperature sensor 134. As a result, the output of the differential amplifier, i.e., the voltage output S of the leak detecting circuit 71 varies as shown in FIG. 6.

Figure 7:
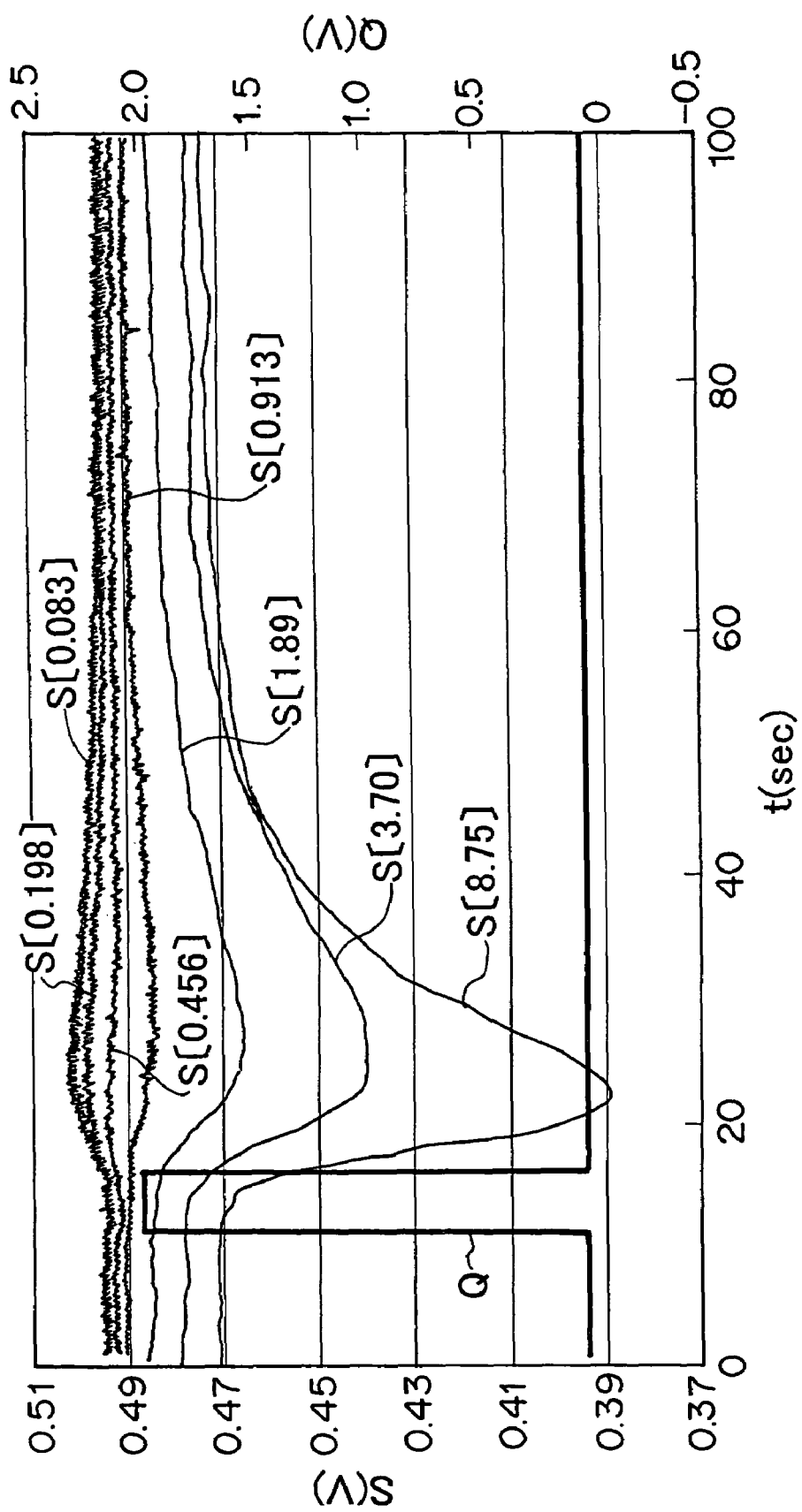
FIG. 7 is a view showing a concrete example of a relationship between the voltage Q applied to the thin-film heating element and voltage output S of the leakage detecting circuit.

FIG. 7 shows a concrete example of a relationship between the voltage Q applied from the pulse voltage generating circuit 67 to the thin-film heating element 182 and voltage output S of the leak detecting circuit 71. In this example, a single pulse voltage has a pulse height Vh corresponding to 2 V and a pulse width t1 corresponding to 5 seconds, and a liquid level variation rate F [mm/h] is varied to obtain a voltage output S [F].

When the pulse voltage generating circuit 67 starts applying the single pulse voltage to the thin-film heating element 182 of the heater 135, the CPU 68 integrates a difference $(S_0-S)$ between the voltage output S of the leak detecting circuit and its initial value (i.e., value obtained at the single pulse voltage application start time) $S_0$ for a predetermined time period t3 after the start of the single pulse voltage application. The integrated value $\int(S_0-S)dt$ corresponds to the area marked with diagonal or oblique lines in FIG. 6 and to a value equivalent to the flow rate of liquid in the measuring slim-tube 13*b*. When the value equivalent to the flow rate falls within a predetermined range, the CPU 68 determines that leakage of liquid in the tank 1 occurs and issues a leakage detection signal. The predetermined time period t3 corresponds to, e.g., 20 to 150 seconds.

Figure 8:
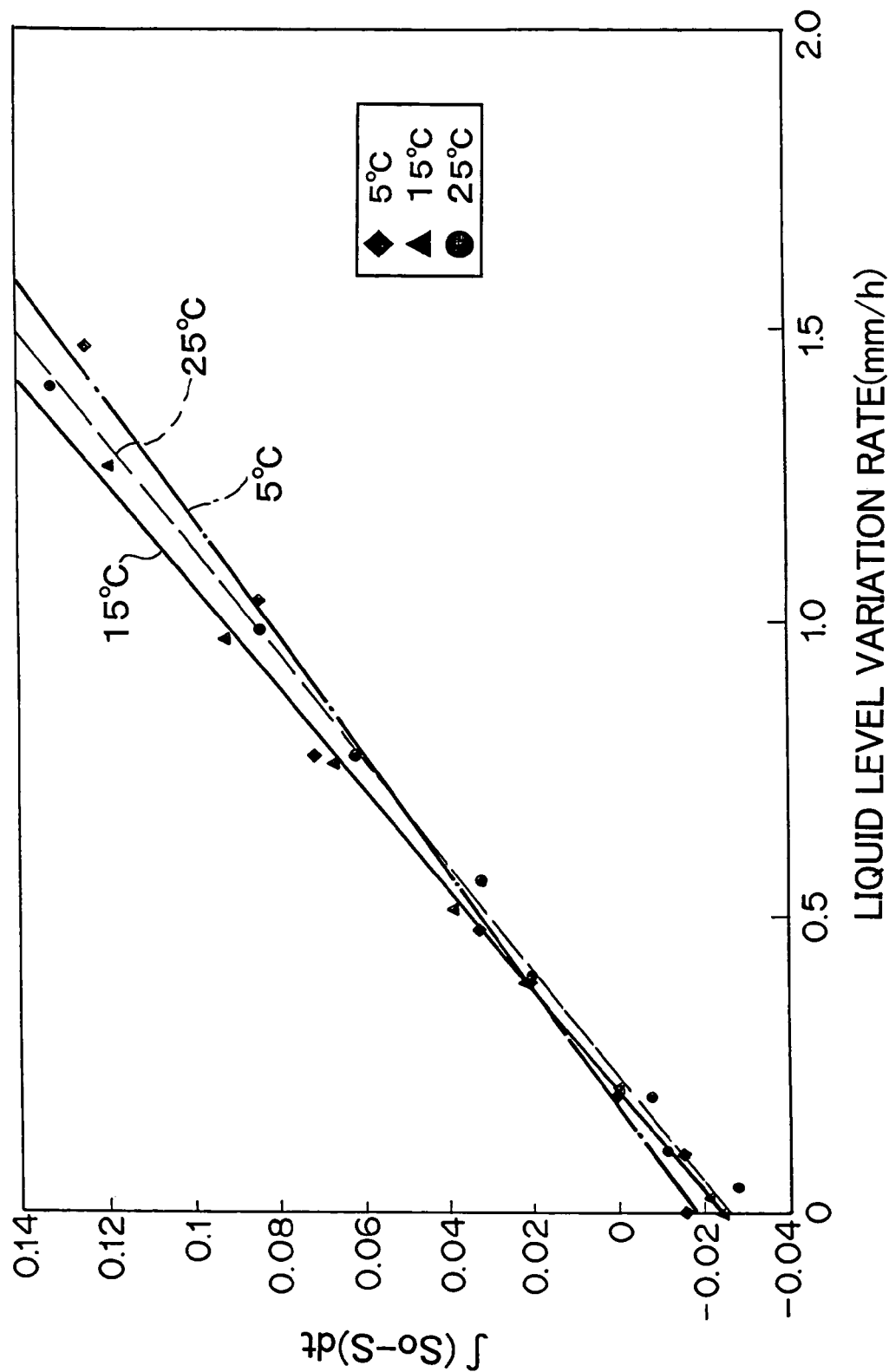
FIG. 8 is a view showing a concrete example of a relationship between a liquid level variation speed and an integrated value $\int(S_0-S)dt$.

FIG. 8 shows a concrete example of a relationship between the liquid level variation rate corresponding to the liquid flow rate F in the measuring slim-tube 13*b* and the above integrated value $\int(S_0-S)dt$. In this example, the predetermined time period t3 for obtaining the integrated value is set to 30 seconds, and relations are obtained for three different temperatures. It can be seen from FIG. 8 that a favorable linear relationship exists between the liquid level variation rate and the integrated value $\int(S_0-S)dt$ in the region where the liquid level variation rate is set to 1.5 mm/h or less, irrespective of the set temperature. While a favorable linear relationship is represented in the region where the liquid level variation rate is set to 1.5 mm/h or less, it is possible to obtain a favorable linear relationship in the region where the liquid level variation rate is set to 20 mm/h or less by appropriately setting a ratio of the sectional area of the measuring slim-tube relative to that of the measuring tube or the length of the measuring slim-tube.

Such a typical relationship between the integrated value $\int(S_0-S)dt$ and the liquid level variation rate can be previously stored in the memory 70 as a calibration curve. Therefore, it is possible to obtain leakage of liquid in the tank as a liquid level variation rate by referring to the stored data in the memory 70 according to the integrated value $\int(S_0-S)dt$ corresponding to a value equivalent to the flow rate calculated by using the output of the leak detecting circuit 71 to perform conversion. However, in the case where a liquid level variation rate smaller than a given value (e.g., 0.01 mm/h) is obtained, it is possible to determine that the variation is not due to leakage but to a measurement error.

The leakage detection operation as described above is repeatedly performed at an appropriate time interval t2. The time interval t2 corresponds to, e.g., 40 seconds to 5 minutes (t2 needs to be larger than integration time period t3).

A liquid level variation in the tank 1 occurs also when liquid is introduced into the tank through the liquid inlet 6 or when liquid is supplied to the outside through the liquid supply port 7. However, the rising or sinking rate of liquid level in the tank 1 obtained in the above case is generally considerably larger than the liquid level variation rate obtained in the case where leakage occurs. Accordingly, the integrated value $\int(S_0-S)dt$ becomes larger than that obtained in the case of leakage. Therefore, the range (e.g., a range of 0 to 1.0 [corresponding to a liquid level variation rate ranging from 0.2 to 1.2 mm/h]) of the integrated value $\int(S_0-S)dt$ that cannot be obtained at the liquid introduction time or supply time but can be obtained only at the leakage time is previously set, and the set value is then stored in the memory 70. In doing so, it is possible to use the set range of the integrated value as a reference for a determination of presence or absence of leakage which is made based on the integrated value $\int(S_0-S)dt$. While the range of the integrated value $\int(S_0-S)dt$ corresponding to a liquid level variation rate ranging from 0.2 to 1.2 mm/h is used as the reference to determine the presence or absence of leakage in this example, it is possible to use the range of the integrated value $\int(S_0-S)dt$ corresponding to an appropriate range within which the liquid level variation rate ranges from 0.01 to 20 mm/h by appropriately setting a ratio of the sectional area of the measuring slim-tube relative to that of the measuring tube or the length of the measuring slim-tube.

That is, the CPU 68 determines the presence of leakage only when a value equivalent to the flow rate falls within a predetermined range and outputs a leakage detection signal indicating the determination result. The leakage detection signal is transmitted to the outside by wire or radio. Further, the result of the leakage determination can be stored in the memory 70 and can be displayed on a not-shown display means provided in the circuit container 15 as needed.

The liquid level variation rate correlates with a leakage amount (leakage amount per unit time). That is, a value obtained by multiplying the liquid level variation rate by the horizontal sectional area inside the tank obtained at a height position corresponding to the liquid level corresponds to the leakage amount of liquid. Therefore, it is possible to obtain the amount of leakage of liquid in the tank based on the liquid level and leakage (liquid level variation rate) detected as described above by previously storing the shape or size (i.e., relationship between the height position and horizontal sectional area inside the tank) in the memory 70 and referring to the stored data in the memory 70.

In the case where the tank has a vertically elongated cylindrical shape as shown in FIG. 1, i.e., the horizontal sectional area inside the tank is constant irrespective of the vertical position, a simple proportional relationship is established between the liquid level variation rate and leakage amount. Therefore, it is possible to easily calculate the leakage amount by multiplying the liquid level variation rate by a proportional constant corresponding to the horizontal sectional area inside the tank without relation to the liquid level value itself. That is, in this case, leakage detected by the detector of the present invention is substantially equal to a value obtained based on the leakage amount.

Figure 9:
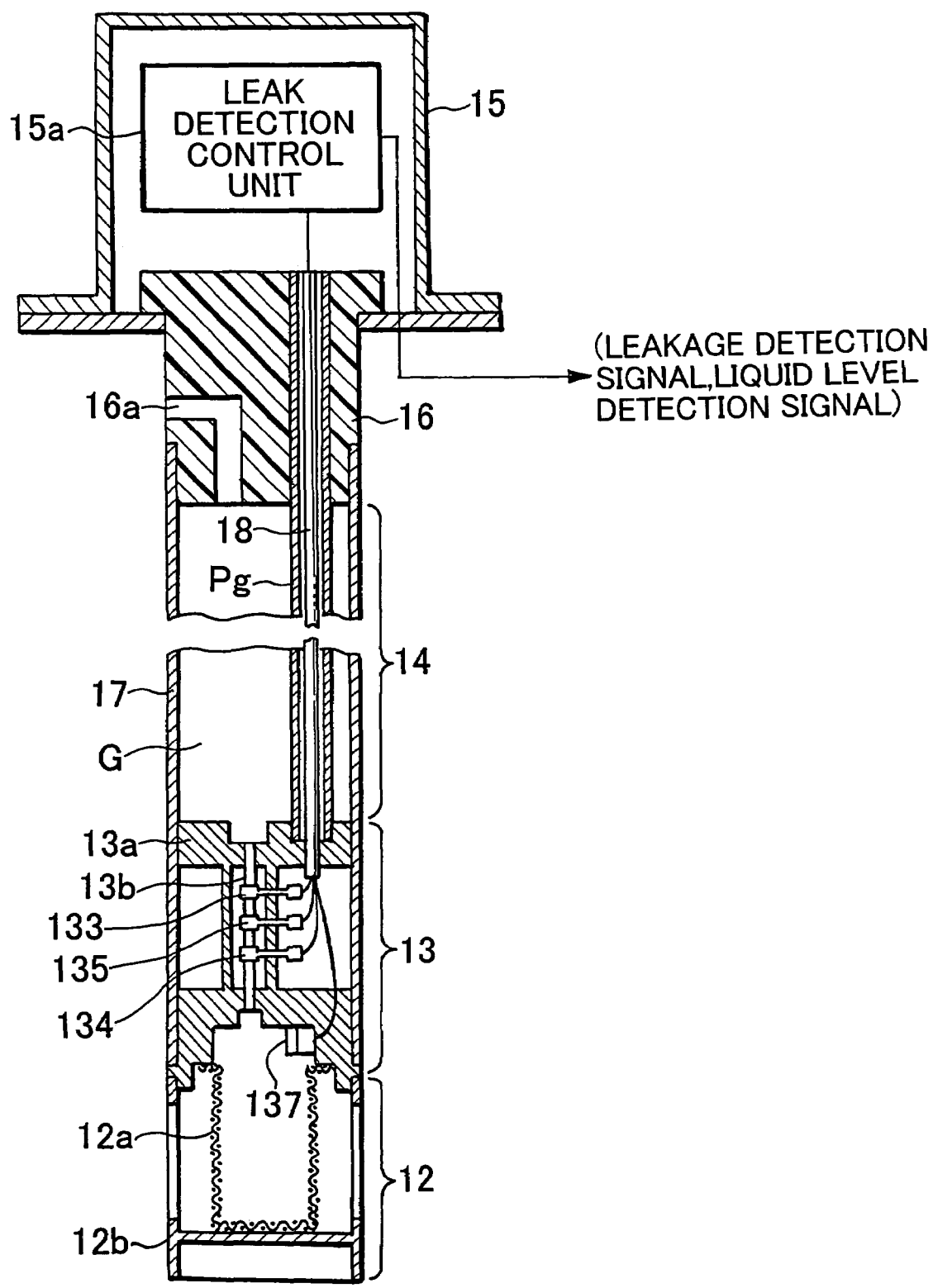
FIG. 9 is a partially omitted cross-sectional view for explaining another embodiment of the leak detector of liquid in a tank according to the present invention.

FIG. 9 is a partially omitted cross-sectional view for explaining another embodiment of the leak detector of liquid in a tank according to the present invention. In FIG. 9, the same reference numerals denote the same or corresponding parts as in FIG. 2. The partially broken perspective view of the present embodiment is the same as that shown in FIG. 1. Further, the enlarged perspective view of the attachment part where the first temperature sensor, the heater and the second temperature sensor are attached to the measuring slim-tube of the detector in this embodiment and cross-sectional view thereof are the same as those shown in FIGS. 3 and 4.

In the present embodiment, a pressure sensor 137 is attached to the sensor holder 13*a* at the portion near the lower end of the measuring slim-tube 13*b* in the flow rate measurement section 13. The pressure sensor 137, which is used for measuring the level of liquid L in the tank, can be a piezoelectric element or condenser type pressure detecting element. The pressure sensor 137 outputs an electrical signal corresponding to the liquid level, e.g., a voltage signal.

Inside the guide pipe Pg, the wiring 18 extends so as to connect the first temperature sensor 133, heater 135, second temperature sensor 134, and pressure sensor 137 of the flow rate measurement section 13 with the leak detection control unit 15*a*.

The leak detector 11 having the configuration described above is attached to the measurement port 5 of the tank 1. Then, the liquid surface LS of the liquid L in the tank is positioned in the height range of the liquid pool section 14, as described above. Accordingly, the pressure sensor 137 is immersed in the liquid L in the tank which has been subjected to filtration by the filter 12a of the liquid inlet/outlet section 12. The liquid L in the tank rises through the measuring slim-tube 13b of the flow rate measurement section 13, introduced into the space G of the liquid pool section 14, with the result that the surface of the liquid in the liquid pool section 14 reaches the same height as the liquid surface LS in the tank outside the leak detector. When the liquid surface LS of the liquid in the tank varies, the surface of the liquid in the liquid pool section 14 correspondingly varies to cause liquid flow in the measuring slim-tube 13b in association with this liquid surface variation, i.e., liquid level variation.

Figure 10:
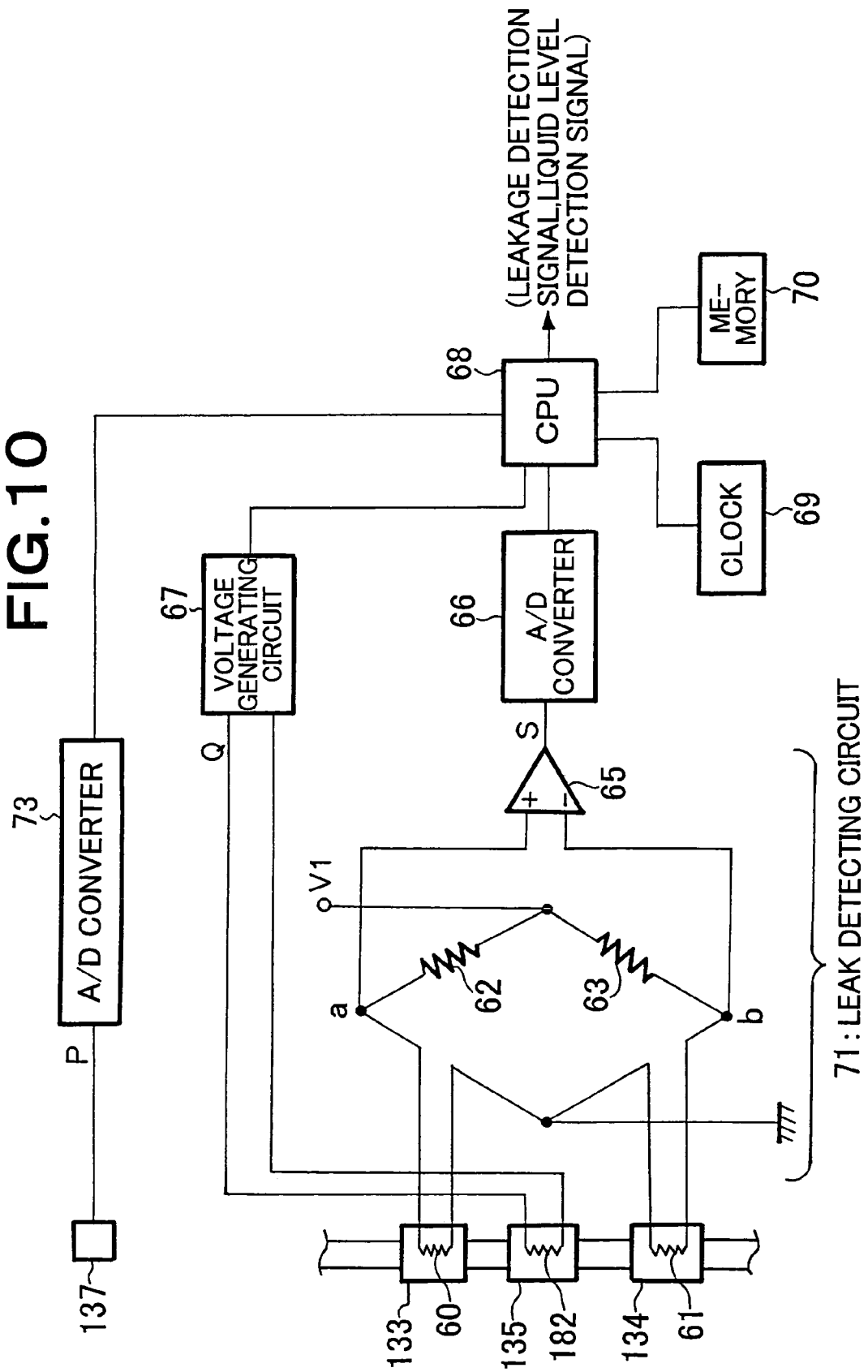
FIG. 10 is a view showing a circuit configuration of the flow rate sensor section, pressure sensor, and leak detection control unit.

FIG. 10 is a view showing a circuit configuration of the flow rate sensor section, pressure sensor, and leak detection control unit. In FIG. 10, the same reference numerals denote the same or corresponding parts as in FIG. 5. As a power source for the circuits, a not-shown battery disposed in the circuit container 15 can be used.

The thin-film heating element 182 of the heater 135 is connected to the voltage generating circuit 67. In the present embodiment, a pulse voltage generating circuit is used as the voltage generating circuit 67. A single pulse voltage is timely applied from the pulse voltage generating circuit to the thin-film heating element 182. The thin-film temperature sensitive elements 60 and 61 respectively constituting the first and second temperature sensors 133 and 134 are connected to the leak detecting circuit 71. That is, the thin-film temperature sensitive elements 60 and 61 constitute a bridge circuit together with resistors 62 and 63. A supply voltage V1 is supplied to the bridge circuit, and a voltage output signal corresponding to a potential difference between points a and b can be obtained by the differential amplifier 65. The output of the leak detecting circuit 71, which corresponds to a difference between temperatures sensed by the thin-film temperature sensitive elements 60 and 61 of the temperature sensors 133 and 134, is input to the CPU 68 through the A/D converter 66. The pulse voltage generating circuit 67 operates under the control of the CPU 68. On the other hand, the output of the pressure sensor 137 is input to the CPU 68 through the A/D converter 73. The clock 69 and memory 70 are connected to the CPU.

Leakage detection operation, i.e., operation of the CPU 68 in the present embodiment will be described below.

It is also possible to apply, to the present embodiment, the descriptions concerning: the relationship between the voltage Q applied from the (pulse) voltage generating circuit 67 to the thin-film heating element 182 and the voltage output S of the leak detecting circuit 71 (shown in FIG. 6); the relationship between the voltage Q applied from the (pulse) voltage generating circuit 67 to the thin-film heating element 182 and the voltage output S of the leak detecting circuit 71 (shown in FIG. 7); and the relationship between the liquid level variation rate corresponding to the liquid flow rate F in the measuring slim-tube 13b and the integrated value $\int(S_0-S)dt$ (shown in FIG. 8). The leakage detection using the integrated value $\int(S_0-S)dt$ as a value equivalent to the flow rate is defined as a first leakage detection in the present embodiment.

In the present embodiment, liquid leakage operation is performed as follows.

When receiving an output P equivalent to liquid level which is input from the pressure sensor 137 through the A/D converter 73, the CPU 68 can immediately convert it into a liquid level p. While the value of the liquid level p is based on the height of the pressure sensor 137, it is possible to convert the value to the liquid level value with respect to the height of the bottom of the tank by taking into account the vertical position of the measurement port 5 in the tank 1 and the distance from the attachment part of the leak detector to the measurement port 5 to the pressure sensor 137. A liquid level detection signal indicating results of the liquid level detection is output from the CPU 68.

The CPU 68 stores the value of the liquid level p in the memory 70 at a constant time interval tt of, e.g., 2 to 10 seconds, calculates a difference between the current value and previous value for each storage operation, and stores the difference in the memory 70 as a value of liquid level variation rate p' with respect to time.

Figure 11:
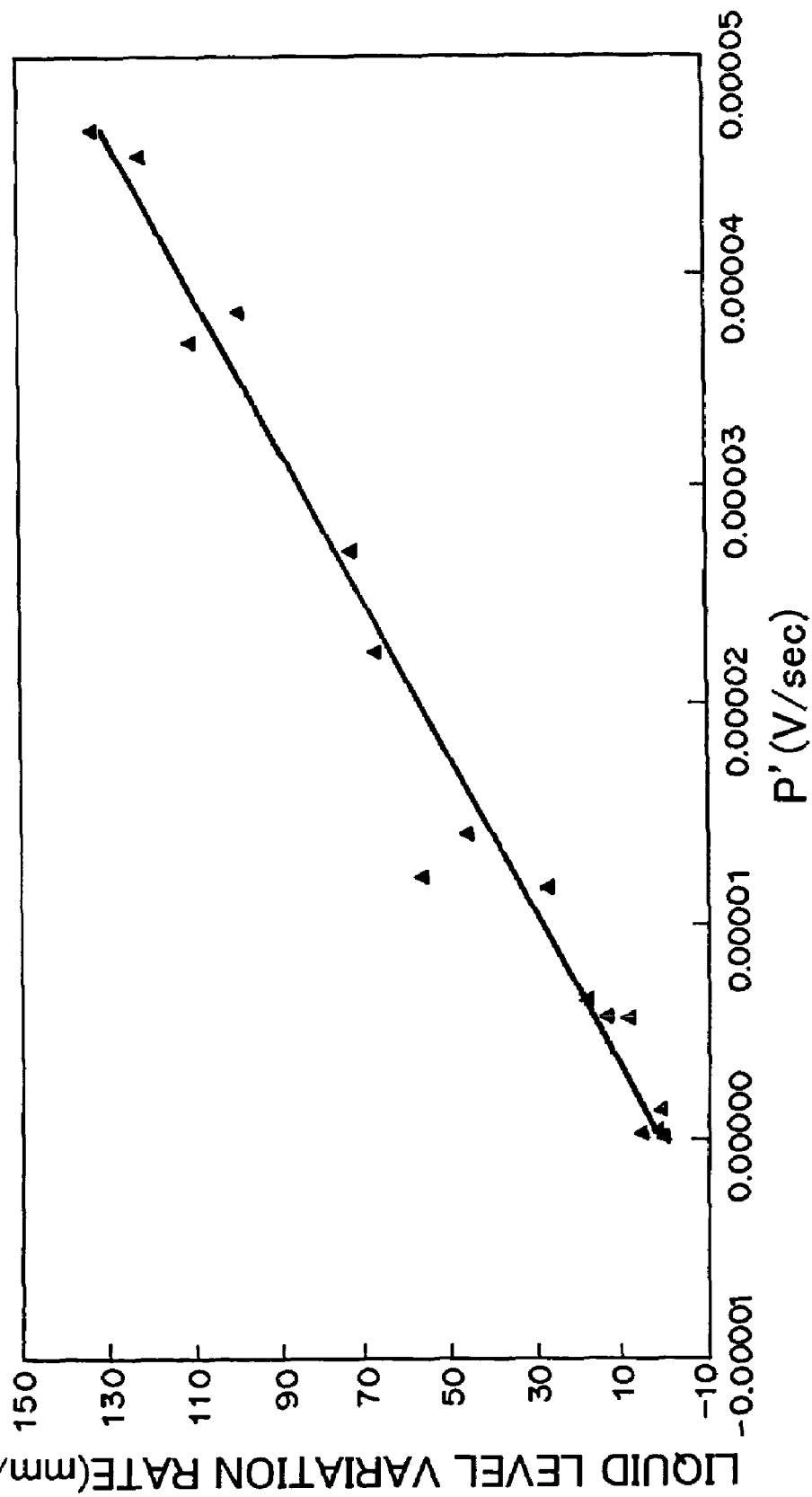
FIG. 11 is a view showing a concrete example of a relationship between a liquid level variation speed and a variation rate P' with respect to time of an output equivalent to liquid level.

FIG. 11 shows a concrete example of a relationship between the liquid level variation rate and the variation rate P' with respect to time of the output P equivalent to liquid level. It can be seen from FIG. 11 that a favorable linear relationship exists between the liquid level variation rate and the variation rate P' with respect to time of the output P equivalent to liquid level in the region where the liquid level variation rate is set to 150 mm/h or less. This reveals that the liquid level variation rate and the liquid level variation rate p' with respect to time favorably correlate with each other. While a favorable linear relationship is represented in the region where the liquid level variation rate is set to 150 mm/h or less, it is possible to obtain a favorable linear relationship in the region where the liquid level variation rate is set up to 200 mm/h.

Therefore, it is possible to obtain leakage of liquid in the tank as a magnitude of the variation rate p' with respect to time of the liquid level p measured by the pressure sensor 137.

The above second leakage detection can cover wider range of liquid level variation rate than the first leakage detection does. On the other hand, the first leakage detection can measure a minute liquid level variation rate region with higher accuracy than the second leakage detection does.

As described above, a liquid level variation in the tank 1 occurs also when liquid is introduced into the tank through the liquid inlet 6 or when liquid is supplied to the outside through the liquid supply port 7. However, the rising or sinking speed of liquid level in the tank 1 obtained in the above case is generally considerably larger than the liquid level variation rate with respect to time or liquid level variation speed obtained in the case where leakage occurs.

In this situation, the CPU 68 performs the following processing for leakage in the present embodiment.

(1) In the case where the magnitude of the liquid level variation rate p' with respect to time falls within a predetermined range (e.g., 10 to 100 mm/h) in the second leakage detection, the CPU 68 outputs a result of the second leakage detection as a leakage detection signal.

(2) In the case where the magnitude of the liquid level variation rate p' with respect to time falls below the lower limit of the predetermined range (e.g., smaller than 10 mm/h) in the second leakage detection, the CPU 68 outputs a result of the first leakage detection as a leakage detection signal.

(3) In the case where the magnitude of the liquid level variation rate p' with respect to time falls above the upper limit of the predetermined range (e.g., larger than 100 mm/h) in the second leakage detection, the CPU 68 determines that the variation is due to causes (e.g., liquid introduction or liquid supply) other than leakage and does not output a leakage detection signal.

Further, in the present embodiment, in the case where the situation as described in (3) occurs, i.e., in the case where the magnitude of the liquid level variation rate p' with respect to time falls above the upper limit of the predetermined range in the second leakage detection, the CPU 68 can stop the first leakage detection during subsequent predetermined time periods tm. It is preferable that the predetermined time period tm be set to a time length slightly longer than the time needed for liquid surface LS to become flat after liquid is introduced into the tank from the outside or liquid is supplied from the tank to the outside. For example, the predetermined time period tm can be set to a value ranging from 10 to 60 minutes. Particularly, during the predetermined time period tm, the CPU 68 can stop operations of the pulse voltage generating circuit 67 and the leak detecting circuit 71, resulting in a reduction in power consumption.

The liquid level variation speed or liquid level variation rate with respect to time correlates with a leakage amount (leakage amount per unit time). That is, a value obtained by multiplying the liquid level variation speed or liquid level variation rate with respect to time by the horizontal sectional area inside the tank obtained at a height position corresponding to the liquid level corresponds to the leakage amount of liquid. Therefore, it is possible to obtain the amount of leakage of liquid in the tank based on the liquid level and leakage (liquid level variation speed or liquid level variation rate with respect to time) detected as described above by previously storing the shape or size (i.e., relationship between the height position and horizontal sectional area inside the tank) in the memory 70 and referring to the stored data in the memory 70.

In the case where the tank has a vertically elongated cylindrical shape as shown in FIG. 1, i.e., the horizontal sectional area inside the tank is constant irrespective of the vertical position, a simple proportional relationship is established between the liquid level variation speed or liquid level variation rate with respect to time and the leakage amount. Therefore, it is possible to easily calculate the leakage amount by multiplying the liquid level variation speed or liquid level variation rate with respect to time by a proportional constant corresponding to the horizontal sectional area inside the tank without relation to the liquid level value itself. That is, in this case, leakage detected by the detector of the present invention is substantially equal to a value obtained based on the leakage amount.

While a pulse voltage generating circuit is used as the voltage generating circuit 67 in the above embodiments, a constant voltage generating circuit that applies a constant voltage (i.e., a constant direct current voltage) to the heater 135 can be used as the voltage generating circuit 67. Hereinafter, another embodiment in which such a constant voltage generating circuit is used will be described.

In the present embodiment, a constant direct current voltage Q is applied from a constant voltage generating circuit used as the voltage generating circuit 67 of FIG. 10 to the thin-film heating element 182 of the heater 135. As a result, the heater 135 remains in a constant heat generating state. Part of the heat is transmitted to the liquid in the measuring slim-tube 13b through the heat transfer member 181 so as to be used as a heat source for heating the liquid.

Assuming that liquid is not flowing through the measuring slim-tube 13b, i.e., the flow rate of liquid in the measuring slim-tube 13b is 0, the temperature detected by the first and second temperature sensors 133 and 134 is substantially the same, if contribution of natural convection to the heat transfer is ignored. However, liquid flow occurs in the measuring slim-tube 13b, the heat from the heater 135 is transferred more to the downstream side than to upstream side. As a result, a difference occurs between the temperatures that the first and second temperature sensors 133 and 134 detect. Since a voltage output corresponding to the difference between the temperatures detected by the first and second temperature sensors 133 and 134 corresponds to the liquid flow rate, the obtained voltage output is set as a flow rate value output. That is, potentials at points a and b of the bridge-circuit of the leak detecting circuit 71 are input to the differential amplifier 65. It is possible to obtain, from the differential amplifier, a voltage output S corresponding to the difference between the temperatures detected by the first and second temperature sensors 133 and 134 by appropriately setting resistance values of the resistors 62 and 63 of the bridge circuit in advance.

In the manner as described above, a flow rate measurement based on temperature difference between two fixed points is performed. In the flow rate measurement based on temperature difference between two fixed points according to the present invention, a value equivalent to the flow rate is obtained based on a temperature difference (actually, a difference in electrical characteristics corresponding to the detected temperature difference) detected by the first and second temperature sensors disposed on the upstream and downstream sides of the heater.

Leakage detection operation, i.e., operation of the CPU 68 in the present embodiment will next be described. The operation of the CPU 68 in the present embodiment is the same as that in the above embodiments in which a pulse voltage generating circuit is used as the voltage generating circuit 67 except the operation of the first leakage detection.

Figure 12:
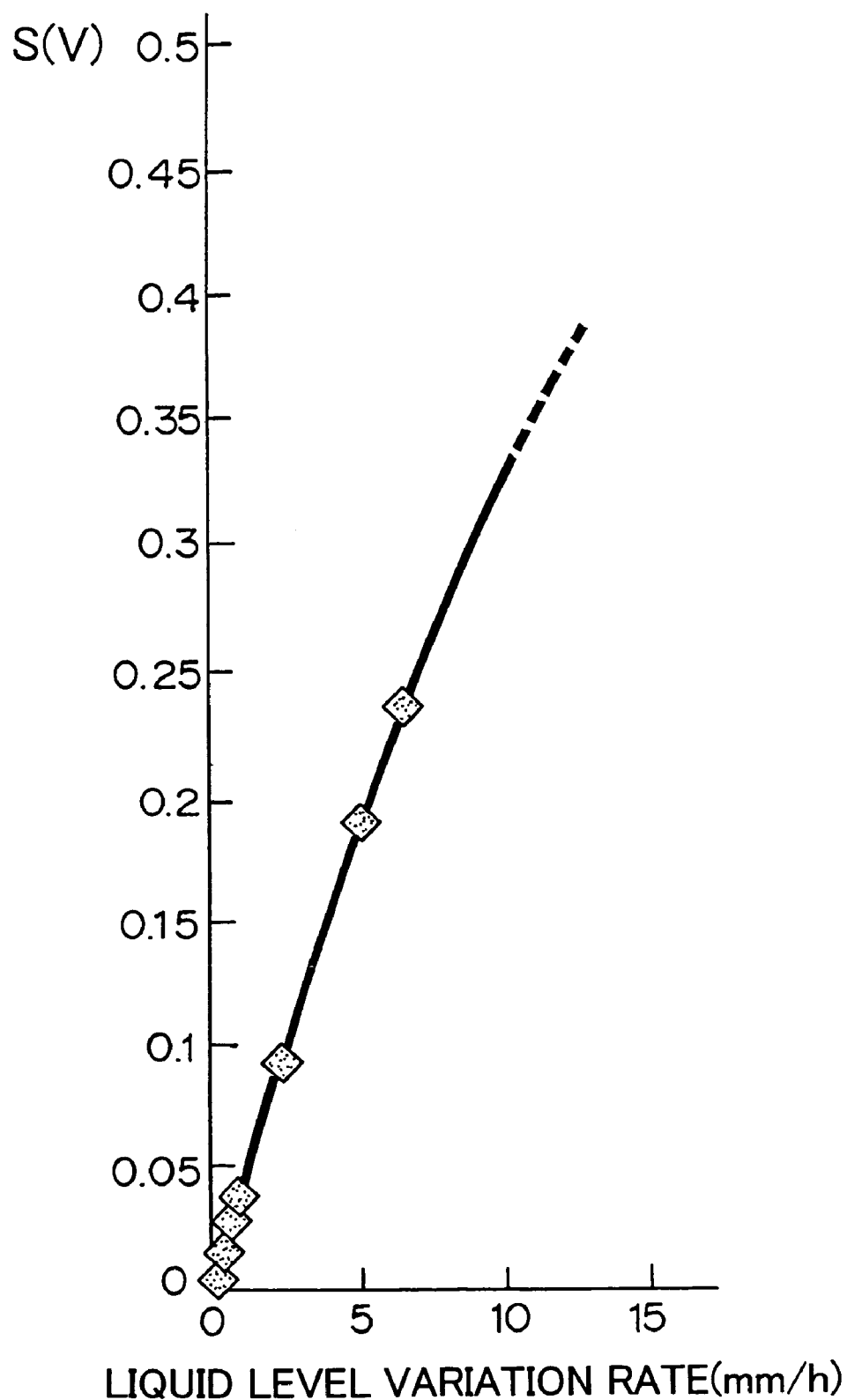
FIG. 12 is a view showing an example of a calibration curve for conversion of a voltage output S of the leak detecting circuit.

The CPU 68 uses a stored calibration curve to convert the output voltage S into a corresponding flow rate value. FIG. 12 is a view showing an example of the calibration curve for the conversion of S. As shown in FIG. 12, a favorable linear relationship exists between the liquid level variation speed or liquid level variation rate and the voltage output S in the region where the liquid level variation rate corresponding to a flow rate value is set to, e.g., 10 mm/h or less. Therefore, the same processing as that performed in the above embodiments in which a pulse voltage generating circuit is used as the voltage generating circuit 67 can be performed for leakage detection in the present embodiment.

The present embodiment has an advantage that a calculation performed by the CPU 68 for obtaining the value equivalent to the flow rate in the first leakage detection becomes easier than the calculation performed in the above embodiment in which a pulse voltage generating circuit is used as the voltage generating circuit 67.

Figure 13:
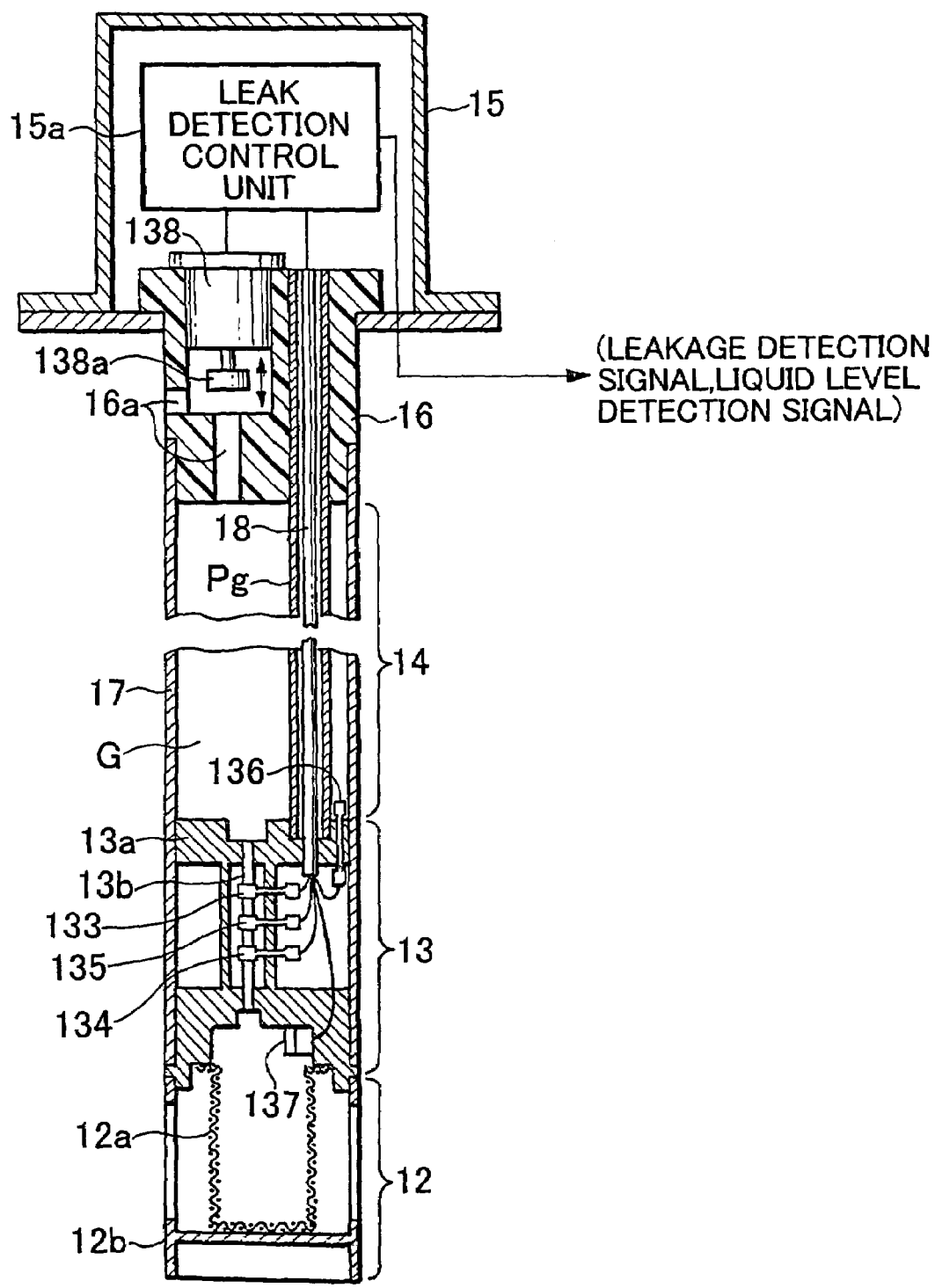
FIG. 13 is a partly omitted cross-sectional view for explaining a still another embodiment of the leak detector of liquid in a tank according to the present invention.

FIG. 13 is a partially omitted cross-sectional view for explaining a still another embodiment of the leak detector of liquid in a tank according to the present invention. In FIG. 13, the same reference numerals denote the same or corresponding parts as in FIGS. 2 and 9. The partially broken perspective view of the present embodiment is the same as that shown in FIG. 1. Further, the enlarged perspective view of the attachment part where the first temperature sensor, the heater and the second temperature sensor are attached to the measuring slim-tube of the detector in this embodiment and cross-sectional view thereof are the same as those shown in FIGS. 3 and 4.

In the present embodiment, a third temperature sensor 136 for measuring the temperature of liquid in the space G is attached to the sensor holder 13a.

The cap 16 is fixed to the upper portion of the sheath pipe 17 and has the air path 16a for communicating the space in the liquid pool section 14 with space in the tank 1 outside the detector. An on-off valve 138 for opening the air path 16a and closing the same is disposed in the cap 16. A valve body 138a of the on-off valve can be moved in the vertical direction to close the air path 16a at the lowermost position (on-off valve is in an open state) and open the air path 16a at a higher position (on-off valve is in an closed state) than the lowermost position. The circuit container 15, which is attached to the cap 16, contains the leak detection control unit 15a. The guide pipe Pg extends in the sheath pipe 17 so as to connect the upper portion of the sensor holder 13a and the cap 16 and, inside the guide pipe Pg, a wiring 18 extends so as to connect the first temperature sensor 133, heater 135, second temperature sensor 134, pressure sensor 137, and third temperature sensor 136 of the flow rate measurement section 13 with the leak detection control unit 15a. The on-off valve 138 is connected to the leak detection control unit 15a.

The leak detector 11 having the configuration described above is attached to the measurement port 5 of the tank 1 with the air path 16a made in an open state by the on-off valve 138. Then, the liquid surface LS of the liquid L in the tank is positioned in the height range of the liquid pool section 14, as described above. Accordingly, the pressure sensor 137 is immersed in the liquid L in the tank which has been subjected to filtration by the filter 12a of the liquid inlet/outlet section 12. The liquid L in the tank rises through the measuring slim-tube 13b of the flow rate measurement section 13, introduced into the space G of the liquid pool section 14, with the result that the surface of the liquid in the liquid pool section 14 reaches the same height as the liquid surface LS in the tank outside the leak detector. When the liquid surface LS varies, the surface of the liquid in the liquid pool section 14 correspondingly varies to cause liquid flow in the measuring slim-tube 13b in association with this liquid surface variation, i.e., liquid level variation.

Figure 14:
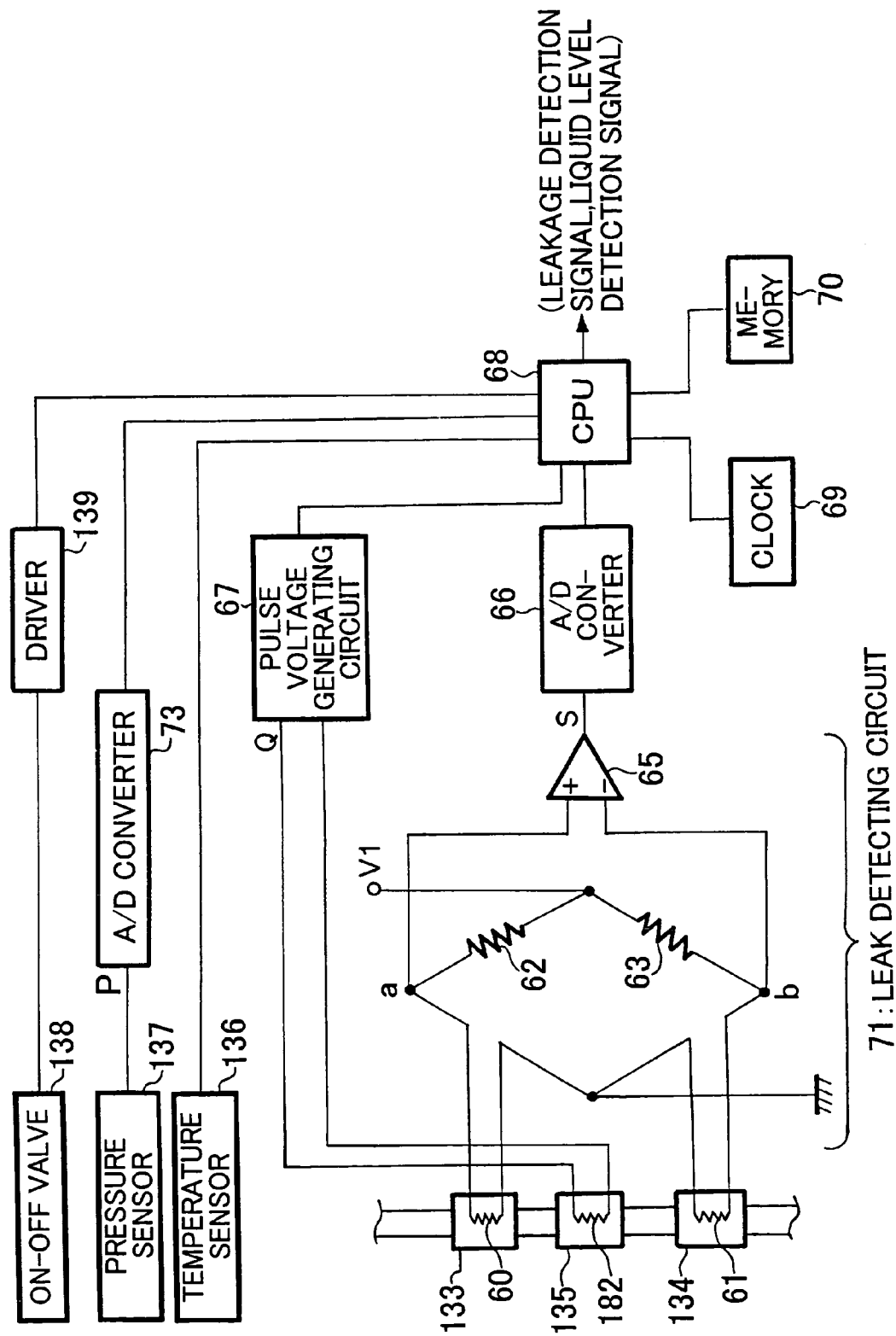
FIG. 14 is a view showing a circuit configuration of the flow rate sensor section, pressure sensor, and leak detection control unit.

FIG. 14 is a view showing a circuit configuration of the flow rate sensor section, the pressure sensor, the third temperature sensor, and the leak detection control unit. In FIG. 14, the same reference numerals denote the same or corresponding parts as in FIGS. 5 and 10. As a power source for the circuits, a not-shown battery disposed in the circuit container 15 can be used.

In the present embodiment, an output of the third temperature sensor 136 is input to the CPU 68. The on-off valve 138 is connected to a driver 139 thereof, and the driver 139 operates under the control of the CPU 68.

Leakage detection operation, i.e., operation of the CPU 68 in the present embodiment will next be described. In the present embodiment, kerosene is used as liquid in the tank.

It is also possible to apply, to the present embodiment, the descriptions concerning: the relationship between the voltage Q applied from the (pulse) voltage generating circuit 67 to the thin-film heating element 182 and the voltage output S of the leak detecting circuit 71 (shown in FIG. 6); the relationship between the voltage Q applied from the (pulse) voltage generating circuit 67 to the thin-film heating element 182 and the voltage output S of the leak detecting circuit 71 (shown in FIG. 7); and the relationship between the liquid level variation rate corresponding to the liquid flow rate F in the measuring slim-tube 13b and the integrated value $\int(S_0-S)dt$ (shown in FIG. 8).

Strictly speaking, the relationship between the integrated value $\int(S_0-S)dt$ and the liquid level variation rate differs depending on the temperature of liquid, as shown in FIG. 8. To cope with this, with a calibration curve indicating a relationship between the integrated value $\int(S_0-S)dt$ and the liquid level variation rate for each temperature previously stored in the memory 70, the CPU 68 uses a calibration curve of the temperature closest to the actually measured temperature value which is obtained by the third temperature sensor 136 and stored in the memory 70, or performs interpolation or extrapolation using calibration curves of a plurality of temperatures to thereby perform conversion from the integrated value $\int(S_0-S)dt$ to the liquid level variation rate. With the above process, it is possible to perform leakage detection with a higher accuracy.

The leakage detection operation (minute leakage detection operation) as described above is repeatedly performed at an appropriate time interval t2. The time interval t2 corresponds to, e.g., 40 seconds to 5 minutes (t2 needs to be larger than integration time period t3).

When receiving an output P equivalent to liquid level which is input from the pressure sensor 137 through the A/D converter 73, the CPU 68 can immediately convert it into a liquid level p. This conversion relates to a specific gravity ρ and can be performed using the following expression (1):

$$p = P/(\rho g) \tag{1}$$

where P is a pressure value measured by the pressure sensor 137, p is a liquid level based on the height position of the pressure sensor 137, and g is gravitational acceleration. While the value of the liquid level p is based on the height of the pressure sensor 137, it is possible to convert the value to the liquid level value with respect to the height of the bottom of the tank by taking into account the vertical position of the measurement port 5 in the tank 1 and the distance from the attachment part of the leak detector to the measurement port 5 to the pressure sensor 137. A liquid level detection signal indicating results of the liquid level detection is output from the CPU 68.

Figure 15:
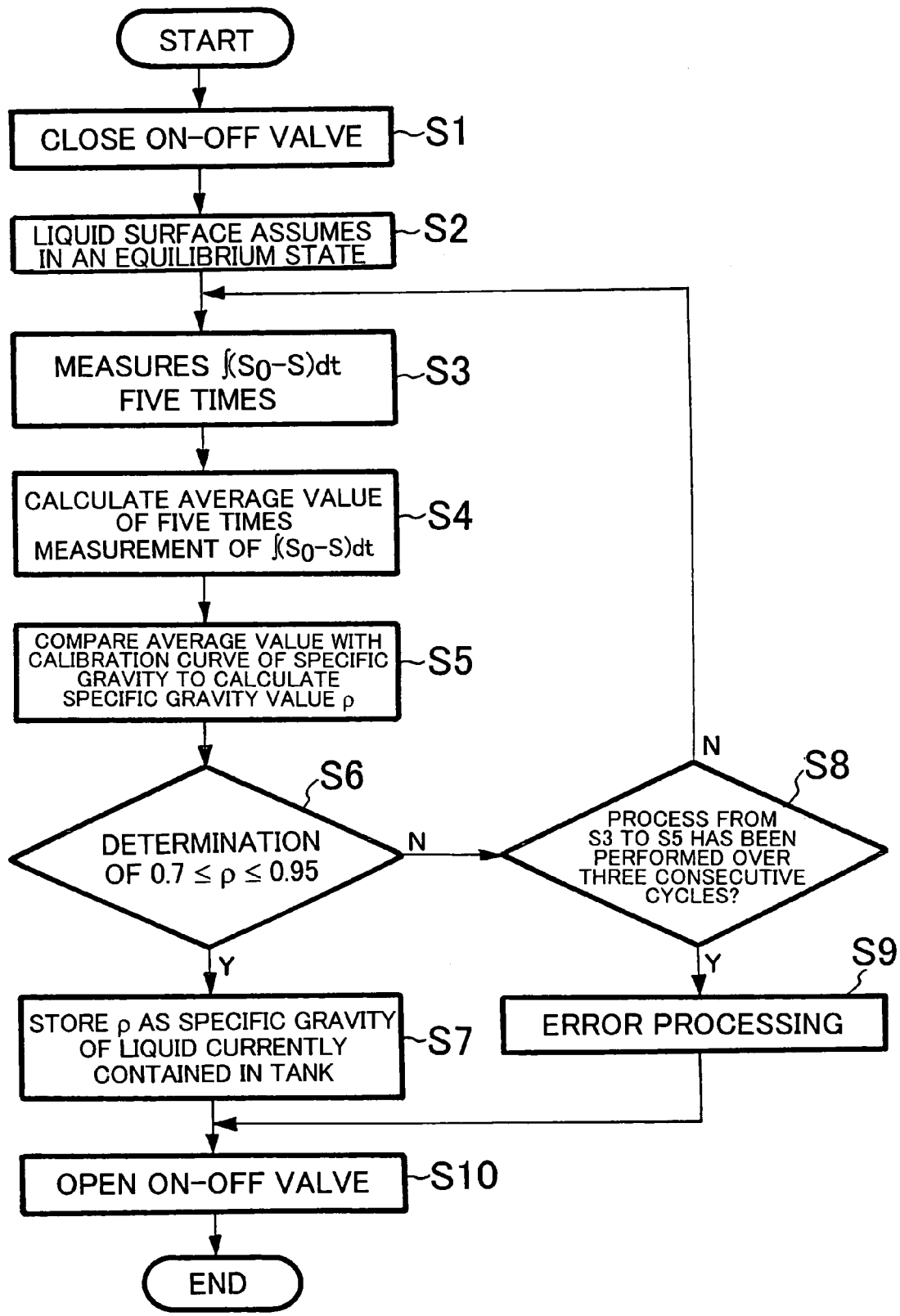
FIG. 15 is a flowchart of specific gravity detection operation, wherein reference numeral 1 denotes a tank, 2 a top panel, 3 a side panel, 4 a bottom panel, 5 a measurement port, 6 a liquid inlet, 7 a liquid supply port, L a liquid, LS a liquid surface, 11 a leak detector, 12 a liquid inlet/outlet section, 12a a filter, 12b a filter cover, 13 a flow rate measurement section, 13a a sensor holder, 13b a measuring slim-tube, 133 a first temperature sensor, 134 a second temperature sensor, 135 a heater, 136 a third temperature sensor, 137 a pressure sensor, 138 an on-off valve, 138 a valve body, 139 a driver, 14 a liquid pool section, G a space, 15 a circuit container, 15a a leak detection control unit, 16 a cap, 16a an air path, 17 a sheath pipe, Pg a guide pipe, 18 a wiring, 181 a heat transfer member, 182 a thin-film heating element, 182' a wiring, 23 a sealing member, 24 a wiring board, 60,61 a thin-film temperature sensitive element, 62,63 a resistor, 65 a differential amplifier, 66 an A/D converter, 67 a pulse voltage generating circuit, 68 a CPU, 69 a clock, 70 a memory, 71 a leak detecting circuit, and 73 an A/D converter.

The specific gravity ρ of liquid is detected as follows. The specific gravity detection flow is shown in FIG. 15.

The specific gravity detection operation is performed every time the liquid is supplied for replenishment of the tank and is started by an external input or the like after an appropriate time period needed for liquid surface to become flat after the introduction of liquid into the tank. At this time, the above-mentioned pulse application to the heater 135 of the flow rate sensor section is started (in the case where the pulse application has already been started, it is continued).

After that, the air path 16a is made in closed state by the on-off valve 138 (S1) and, after an appropriate time period (e.g., 2 to 5 minute) needed for liquid surface to become flat (S2), the integrated value $\int(S_0-S)dt$ is measured a plurality of times (e.g., 5 times) (S3), the average value of the obtained integrated values $\int(S_0-S)dt$ is calculated (S4), and a calibration curve of specific gravity is used to calculate a specific gravity ρ from the obtained average value (S5). The calibration curve of specific gravity can be obtained by previously performing measurement of the integrated value $\int(S_0-S)dt$ for liquids of the same kind (e.g., fuel oils including kerosene) having various specific gravities, whose gravities have been known. The obtained measurement results are stored in the memory 70. Note that the measurement of the integrated value $\int(S_0-S)dt$ may be performed only one time in S3. In this case, S4 is omitted and a value obtained through the one measurement is used as the average value in S5.

Next, it is determined whether the obtained specific gravity ρ falls within a range from 0.7 to 0.95 (S6). This determines whether the liquid in the tank is fuel oil or not. When it is determined that ρ falls within the range from 0.7 to 0.95, the liquid is regarded as fuel oil, and the value ρ is stored in the memory 70 as the specific gravity of the liquid currently contained in the tank (S7).

On the other hand, when it is determined that ρ falls outside the range from 0.7 to 0.95, it is determined whether the process from S3 to S5 has been performed over consecutive three cycles (S8). When it is determined that the process from S3 to S5 has been performed over consecutive three cycles, error processing is performed to make final confirmation that the liquid in the tank is not fuel oil (S9). Based on the above error determination, the CPU 68 can issue an appropriate alarm signal. On the other hand, when it is determined in step S8 that the process from S3 to S5 has not been performed over consecutive three cycles, step S3 and subsequent steps are performed. Note that the step S8 may be omitted. In this case, the flow jumps from S6 to S9.

Next, after S7 or S9, the air path 16a is made in open state by the on-off valve 138 (S10) to end the specific gravity detection operation.

The CPU 68 stores the value of the liquid level p obtained as described above in the memory 70 at a constant time interval tt of, e.g., 2 to 10 seconds, calculates a difference between the current value and previous value for each storage operation, and stores the difference in the memory 70 as a value of liquid level variation rate p' with respect to time.

It is also possible to apply, to the present embodiment, the description concerning the relationship between the liquid level variation speed or liquid level variation rate and the variation rate P' with respect to time of the output P equivalent to the liquid level shown in FIG. 11.

Strictly speaking, the specific gravity ρ of liquid differs depending on the temperature of the liquid. It is possible to cope with this by performing the following processing in the above-mentioned specific gravity detection operation.

A calibration curve of specific gravity in reference temperature TR (e.g., 15° C.) is used in this processing. In creating the calibration curve of specific gravity in reference temperature, the specific gravity detected at liquid temperature TA is assumed to be ρ[TA] and, based on this assumption, specific gravity value ρ[TR] in reference temperature TR can be calculated using the following expression (2):

$$\rho[TR]=\rho[TA]+0.00071(TA-TR) \quad (2)$$

where coefficient 0.00071 in the expression (2) is a coefficient used in the case where the liquid is fuel oil.

Assuming that a temperature measured by the third temperature sensor 136 is TX, and a specific gravity value obtained by conversion using the calibration curve of specific gravity in reference temperature is ρ[TX], which are obtained when the specific gravity detection operation of FIG. 15 is performed for the liquid to be detected, corrected specific gravity value ρ'[TX] in current temperature TX can be calculated using the following expression (3):

$$\rho'[TX]=\rho[TX]-0.00071(TX-TR) \quad (3)$$

where coefficient 0.00071 in the expression (3) is a coefficient used in the case where liquid is fuel oil.

By using the corrected specific gravity value ρ' [TX] obtained as described above as the specific gravity value p of the expression (1) to perform conversion to the liquid level, more highly accurate leakage detection can be achieved.

The above leakage detection using the pressure sensor can cover wider range of liquid level variation rate than the minute leakage detection does. On the other hand, the minute leakage detection can measure a minute liquid level variation rate region with higher accuracy than the leakage detection using the pressure sensor does.

A liquid level variation in the tank 1 occurs also when liquid is introduced into the tank through the liquid inlet 6 or when liquid is supplied to the outside through the liquid supply port 7. However, the rising or sinking rate of liquid level in the tank 1 obtained in the above case is generally considerably larger than the liquid level variation speed or liquid level variation rate with respect to time obtained in the case where leakage occurs.

In this situation, the CPU 68 performs the following processing for leakage.

(1) In the case where the magnitude of the liquid level variation rate p' with respect to time falls within a predetermined range (e.g., 10 to 100 mm/h) in the leakage detection using the pressure sensor, the CPU 68 outputs a result of the leakage detection using the pressure sensor as a leakage detection signal.

(2) In the case where the magnitude of the liquid level variation rate p' with respect to time falls below the lower limit of the predetermined range (e.g., smaller than 10 mm/h) in the leakage detection using the pressure sensor, the CPU 68 outputs a result of the minute leakage detection as a leakage detection signal.

(3) In the case where the magnitude of the liquid level variation rate p' with respect to time falls above the upper limit of the predetermined range (e.g., larger than 100 mm/h) in the leakage detection using the pressure sensor, the CPU 68 determines that the variation is due to causes (e.g., liquid introduction or liquid supply) other than leakage and does not output a leakage detection signal.

Further, in the present embodiment, in the case where the situation as described in (3) occurs, i.e., in the case where the magnitude of the liquid level variation rate p' with respect to time falls above the upper limit of the predetermined range in the leakage detection using the pressure sensor, the CPU 68 can stop the first leakage detection during subsequent predetermined time periods tm. It is preferable that the predetermined time period tm be set to a time length slightly longer than the time needed for liquid surface LS to become flat after the liquid is introduced into the tank from the outside or the liquid is supplied from the tank to the outside. For example, the predetermined time period tm can be set to a value ranging from 10 to 60 minutes. Particularly, during the predetermined time period tm, the CPU 68 can stop operations of the pulse voltage generating circuit 67 and the leak detecting circuit 71, resulting in a reduction in power consumption.

The liquid level variation speed or liquid level variation rate with respect to time correlates with a leakage amount (leakage amount per unit time). That is, a value obtained by multiplying the liquid level variation speed or liquid level variation rate with respect to time by the horizontal sectional area inside the tank obtained at a height position corresponding to the liquid level corresponds to the leakage amount of liquid. Therefore, it is possible to obtain the amount of leakage of liquid in the tank based on the liquid level and leakage (liquid level variation speed or liquid level variation rate with respect to time) detected as described above by previously storing the shape or size (i.e., relationship between the height position and horizontal sectional area inside the tank) in the memory 70 and referring to the stored data in the memory 70.

In the case where the tank has a vertically elongated cylindrical shape as shown in FIG. 1, i.e., the horizontal sectional area inside the tank is constant irrespective of the vertical position, a simple proportional relationship is established between the liquid level variation speed or liquid level variation rate with respect to time and the leakage amount. Therefore, it is possible to easily calculate the leakage amount by multiplying the liquid level variation speed or liquid level variation rate with respect to time by a proportional constant corresponding to the horizontal sectional area inside the tank without relation to the liquid level value itself. That is, in this case, leakage detected by the detector of the present invention is substantially equal to a value obtained based on the leakage amount.

What is claimed is:

1. A leak detector of liquid in a tank, comprising:
a measuring slim-tube into/from which the liquid in the tank is introduced or discharged through the lower end thereof;
a measuring tube connected to the upper end of the measuring slim-tube and having a sectional area larger than that thereof;
a sensor section additionally provided to the measuring slim-tube and including a first temperature sensor, a heater and a second temperature sensor arranged in this order along the measuring slim-tube, the sensor section measuring the flow rate of the liquid in the measuring slim-tube; and
a leak detection control unit connected to the sensor section,
wherein the leak detection control unit has a pulse voltage generating circuit for applying a single pulse voltage to the heater and a leak detecting circuit connected to the first and second temperature sensors and generating an output corresponding to a difference between temperatures detected by the first and second temperature sensors, and
wherein the leak detection control unit integrates a difference between an output of the leak detecting circuit and its initial value in response to the application of the single pulse voltage to the heater which is performed by the pulse voltage generating circuit to calculate a value equivalent to the flow rate of the liquid to thereby detect leakage of the liquid in the tank based on the calculated value.

2. The leak detector as claimed in claim 1, wherein the leak detection control unit issues a leakage detection signal when the value equivalent to the flow rate of the liquid falls within a predetermined range.

3. The leak detector as claimed in claim 1, wherein a circuit container is attached to the upper portion of the measuring tube, and the leak detection control unit is provided in the circuit container.

4. The leak detector as claimed in claim 1, wherein each of the first and second temperature sensors has a first heat transfer member brought into contact with the outer surface of the measuring slim-tube and a temperature sensitive element coupled to the first heat transfer member, and the heater has a second heat transfer member brought into contact with the outer surface of the measuring slim-tube and a heating element coupled to the second heat transfer member.

5. The leak detector as claimed in claim 1, wherein the single pulse voltage has a pulse width of 2 to 10 seconds, and the value equivalent to the flow rate of the liquid is a value obtained by integrating the output of the leak detecting circuit for 20 to 150 seconds.

6. The leak detector as claimed in claim 5, wherein the pulse voltage generating circuit applies the single pulse voltage to the heater at a time interval of 40 seconds to 5 minutes, provided that the time interval is larger than integration time period during which the difference between the output of the leak detecting circuit and its initial value is integrated.

7. A leak detector of liquid in a tank, comprising:
a measuring slim-tube into/from which the liquid in the tank is introduced or discharged through the lower end thereof;
a measuring tube connected to the upper end of the measuring slim-tube and having a sectional area larger than that thereof;
a flow rate sensor section additionally provided to the measuring slim-tube and including a first temperature sensor, a heater and a second temperature sensor arranged in this order along the measuring slim-tube, the flow rate sensor section measuring the flow rate of the liquid in the measuring slim-tube;
a pressure sensor for measuring the level of the liquid; and
a leak detection control unit connected to the flow rate sensor section and pressure sensor,
wherein the leak detection control unit has a voltage generating circuit for applying a voltage to the heater and a leak detecting circuit connected to the first and second temperature sensors and generating an output corresponding to a difference between temperatures detected by the first and second temperature sensors,
wherein the leak detection control unit performs a first leakage detection that detects leakage of the liquid in the tank based on the value equivalent to the flow rate of the liquid which is calculated using an output of the leak detecting circuit and a second leakage detection that detects leakage of the liquid in the tank based on the magnitude of a variation rate with respect to time of the level of liquid which is measured by the pressure sensor, and
wherein the leak detection control unit outputs a result of the second leakage detection in the case where the magnitude of the liquid level variation rate with respect to time falls within a predetermined range in the second leakage detection, outputs a result of the first leakage detection in the case where the magnitude of the liquid level variation rate with respect to time falls below the lower limit of the predetermined range in the second leakage detection, and stops the output of a leakage detection signal in the case where the magnitude of the liquid level variation rate with respect to time falls above the upper limit of the predetermined range in the second leakage detection.

8. The leak detector as claimed in claim 7, wherein the voltage generating circuit is a constant voltage generating circuit that applies a constant voltage to the heater.

9. The leak detector as claimed in claim 7, wherein the leak detection control unit calculates the liquid level variation rate with respect to time at a time interval of 2 to 10 seconds.

10. The leak detector as claimed in claim 7, wherein a circuit container is attached to the upper portion of the measuring tube, and the leak detection control unit is provided in the circuit container.

11. The leak detector as claimed in claim 7, wherein the pressure sensor is disposed near the lower end of the measuring slim-tube.

12. The leak detector as claimed in claim 7, wherein each of the first and second temperature sensors has a first heat transfer member brought into contact with the outer surface of the measuring slim-tube and a temperature sensitive element coupled to the first heat transfer member, and the heater has a second heat transfer member brought into contact with the outer surface of the measuring slim-tube and a heating element coupled to the second heat transfer member.

13. The leak detector as claimed in claim 7, wherein the leak detection control unit stops the first leakage detection for a predetermined time length in the case where the magnitude of the liquid level variation rate with respect to time falls above the upper limit of the predetermined range in the second leakage detection.

14. The leak detector as claimed in claim 13, wherein the leak detection control unit stops operations of the voltage generating circuit and leak detecting circuit for the predetermined time length in the case where the magnitude of the liquid level variation rate with respect to time falls above the upper limit of the predetermined range in the second leakage detection.

15. The leak detector as claimed in claim 7, wherein the voltage generating circuit is a pulse voltage generating circuit that applies a single pulse voltage to the heater, and the leak detection control unit integrates a difference between an output of the leak detecting circuit and its initial value in response to the application of the single pulse voltage to the heater which is performed by the pulse voltage generating circuit to calculate the value equivalent to the flow rate of the liquid to thereby detect leakage of the liquid in the tank based on the calculated value.

16. The leak detector as claimed in claim 15, wherein the single pulse voltage has a pulse width of 2 to 10 seconds, and the value equivalent to the flow rate of the liquid is a value obtained by integrating the output of the leak detecting circuit for 20 to 150 seconds.

17. The leak detector as claimed in claim 16, wherein the pulse voltage generating circuit applies the single pulse voltage to the heater at a time interval of 40 seconds to 5 minutes, provided that the time interval is larger than integration time period during which the difference between the output of the leak detecting circuit and its initial value is integrated.

18. A leak detector of liquid in a tank, comprising:
   a measuring slim-tube into/from which the liquid in the tank is introduced or discharged through the lower end thereof;
   a measuring tube connected to the upper end of the measuring slim-tube and having a sectional area larger than that thereof;
   a flow rate sensor section additionally provided to the measuring slim-tube and including a first temperature sensor, a heater and a second temperature sensor arranged in this order along the measuring slim-tube, the flow rate sensor section measuring the flow rate of the liquid in the measuring slim-tube;
   a pressure sensor for measuring the level of the liquid; and
   a leak detection control unit connected to the flow rate sensor section and pressure sensor,
   wherein the leak detection control unit has a voltage generating circuit for applying a voltage to the heater, a leak detecting circuit connected to the first and second temperature sensors and generating an output corresponding to a difference between temperatures detected by the first and second temperature sensors, and an on-off valve provided in the upper portion of the measuring tube, and
   wherein the leak detection control unit detects the specific gravity of the liquid in the tank based on a value equivalent to the flow rate of the liquid which is calculated by using the output of the leak detecting circuit in a state where the on-off valve is closed, measures the level of the liquid by means of the pressure sensor by using the value of the specific gravity detected in the above to thereby perform a leakage detection of the liquid in the tank based on the magnitude of a variation rate of the level of the liquid with respect to time.

19. The leak detector as claimed in claim 18, wherein the leak detection control unit detects the specific gravity of the liquid a plurality of times to thereby obtain a plurality of specific gravity values, and measures the level of the liquid by using an average value of the plurality of specific gravity values as the value of the specific gravity.

20. The leak detector as claimed in claim 18, wherein the leak detection control unit uses the obtained value of the specific gravity to measure the level of the liquid only when the value of the specific gravity falls within a certain range defined for liquid of a predetermined kind and performs error processing when the obtained value of the specific gravity falls outside the certain range.

21. The leak detector as claimed in claim 18, further comprising a third temperature sensor for measuring the temperature of the liquid,
   wherein the leak detection control unit is connected to the third temperature sensor, and
   wherein the leak detection control unit uses a calibration curve of specific gravity at reference temperature to obtain a specific gravity value when detecting the specific gravity, converts the specific gravity value into the value of the specific gravity at an the temperature of the liquid which is measured by the third temperature sensor, and uses the obtained value of the specific gravity to measure the level of the liquid.

22. The leak detector as claimed in claim 18, wherein the leak detection control unit calculates the liquid level variation rate with respect to time at a time interval of 2 to 10 seconds.

23. The leak detector as claimed in claim 18, wherein a circuit container is attached to the upper portion of the measuring tube, and the leak detection control unit is provided in the circuit container.

24. The leak detector as claimed in claim 18, wherein the pressure sensor is disposed near the lower end of the measuring slim-tube.

25. The leak detector as claimed in claim 18, wherein each of the first and second temperature sensors has a first heat transfer member brought into contact with the outer surface of the measuring slim-tube and a temperature sensitive element coupled to the first heat transfer member, and the heater has a second heat transfer member brought into contact with the outer surface of the measuring slim-tube and a heating element coupled to the second heat transfer member.

26. The leak detector as claimed in claim 18, wherein the leak detection control unit further performs minute leakage detection that detects leakage of the liquid in the tank based on the value equivalent to the flow rate of the liquid which is calculated using the output of the leak detecting circuit in a state where the on-off valve is opened, and
   wherein the leak detection control unit outputs a result of the leakage detection in the case where the magnitude of the liquid level variation rate with respect to time falls within a predetermined range in the leakage detection, outputs a result of the minute leakage detection in the case where the magnitude of the liquid level variation rate with respect to time falls below the lower limit of the predetermined range in the leakage detection, and stops the output of a leakage detection signal in the case where the magnitude of the liquid level variation rate with respect to time falls above the upper limit of the predetermined range in the leakage detection.

27. The leak detector as claimed in claim 26, wherein the leak detection control unit stops the minute leakage detection for a predetermined time length in the case where the magnitude of the liquid level variation rate with respect to time falls above the upper limit of the predetermined range in the leakage detection.

28. The leak detector as claimed in claim 27, wherein the leak detection control unit stops operations of the voltage generating circuit and leak detecting circuit for the predetermined time length in the case where the magnitude of the liquid level variation rate with respect to time falls above the upper limit of the predetermined range in the leakage detection.

29. The leak detector as claimed in claim 18, wherein the voltage generating circuit is a pulse voltage generating circuit that applies a single pulse voltage to the heater, and the leak detection control unit integrates a difference between an output of the leak detecting circuit and its initial value in response to the application of the single pulse voltage to the heater which is performed by the pulse voltage generating circuit to calculate the value equivalent to the flow rate of the liquid.

30. The leak detector as claimed in claim 29, wherein the single pulse voltage has a pulse width of 2 to 10 seconds, and the value equivalent to the flow rate of the liquid is a value obtained by integrating the output of the leak detecting circuit for 20 to 150 seconds.

31. The leak detector as claimed in claim 30, wherein the pulse voltage generating circuit applies the single pulse voltage to the heater at a time interval of 40 seconds to 5 minutes, provided that the time interval is larger than integration time period during which the difference between the output of the leak detecting circuit and its initial value is integrated.

* * * * *